United States Patent
Hao et al.

(10) Patent No.: US 11,606,123 B2
(45) Date of Patent: Mar. 14, 2023

(54) FREQUENCY SELECTIVE UPLINK PRECODING FOR NEW RADIO

(71) Applicant: Qualcomm Incorporated, San Diego, CA (US)

(72) Inventors: Chenxi Hao, Beijing (CN); Yu Zhang, Beijing (CN); Chao Wei, Beijing (CN); Liangming Wu, Beijin (CN); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 461 days.

(21) Appl. No.: 16/615,397

(22) PCT Filed: Jun. 14, 2018

(86) PCT No.: PCT/CN2018/091284
§ 371 (c)(1),
(2) Date: Nov. 20, 2019

(87) PCT Pub. No.: WO2018/228478
PCT Pub. Date: Dec. 20, 2018

(65) Prior Publication Data
US 2020/0186303 A1    Jun. 11, 2020

(30) Foreign Application Priority Data

Jun. 16, 2017    (WO) ................ PCT/CN2017/088702

(51) Int. Cl.
*H04B 7/0456*    (2017.01)
*H04B 7/0404*    (2017.01)
(Continued)

(52) U.S. Cl.
CPC ......... *H04B 7/0456* (2013.01); *H04B 7/0404* (2013.01); *H04B 7/0617* (2013.01);
(Continued)

(58) Field of Classification Search
CPC ..... H04L 5/005; H04L 1/0003; H04B 7/0404; H04B 7/0456; H04B 7/0617; H04B 7/0626; H04B 7/0639
(Continued)

(56) References Cited

U.S. PATENT DOCUMENTS 8,774,310 B2 *  7/2014  Khan ...................... H04L 5/006
                                                            375/296
10,405,323 B2 *  9/2019  Lan ........................... H04L 1/20
(Continued)

FOREIGN PATENT DOCUMENTS

CN    103209012 A    7/2013
CN    103716078 A    4/2014
(Continued)

OTHER PUBLICATIONS

International Search Report and Written Opinion—PCT/CN2017/088702—ISA/EPO—dated Feb. 26, 2018.
(Continued)

*Primary Examiner* — Leila Malek
(74) *Attorney, Agent, or Firm* — Holland & Hart LLP/Qualcomm

(57) ABSTRACT

The described techniques provide for the use of sub-band-specific reference signal precoding. A user equipment (UE) may apply multiple precoding matrices to a reference signal to generate a set of precoded reference signals and may transmit the precoded reference signals over respective sub-bands within a given reference signal resource set. In some cases, the UE may transmit a different set of precoded reference signals in each of multiple reference signal resource sets. Upon receiving the precoded reference signals, a base station may perform wideband channel estimation for each sub-band in the given reference signal resource set. The base station may compute an average spectral
(Continued)

efficiency for each reference signal resource set and may transmit a report to the UE. The report may include one or more communication parameters for future communications between the UE and base station.

30 Claims, 17 Drawing Sheets

(51) Int. Cl.
    *H04B 7/06* (2006.01)
    *H04L 1/00* (2006.01)
    *H04L 5/00* (2006.01)
    *H04L 27/26* (2006.01)

(52) U.S. Cl.
    CPC ......... *H04B 7/0626* (2013.01); *H04B 7/0639* (2013.01); *H04L 1/0003* (2013.01); *H04L 5/005* (2013.01); *H04L 5/0048* (2013.01); *H04L 27/2613* (2013.01)

(58) Field of Classification Search
    USPC .......................................................... 370/329
    See application file for complete search history.

(56) References Cited

U.S. PATENT DOCUMENTS

| | | | |
|---|---|---|---|
| 10,756,862 B2 * | 8/2020 | Kim | H04L 5/001 |
| 2011/0002415 A1 | 1/2011 | Nakao et al. | |
| 2017/0126439 A1 * | 5/2017 | Yoshimoto | H04L 5/006 |
| 2018/0278301 A1 * | 9/2018 | Kim | H04B 7/0695 |

FOREIGN PATENT DOCUMENTS

| | | | | |
|---|---|---|---|---|
| CN | 103746779 A | 4/2014 | | |
| CN | 104935368 A | 9/2015 | | |
| CN | 105187101 A | 12/2015 | | |
| CN | 105531944 A | 4/2016 | | |
| CN | 106656292 A | 5/2017 | | |
| EP | 2426831 A1 | 3/2012 | | |
| WO | WO 2015143605 A | 10/2015 | | |
| WO | WO-2016163805 A1 * | 10/2016 | ............... | H04L 1/18 |
| WO | WO-2017116119 A1 * | 7/2017 | ............... | H04B 7/04 |
| WO | WO-2018170690 A1 * | 9/2018 | ............... | H04L 5/00 |

OTHER PUBLICATIONS

International Search Report and Written Opinion—PCT/CN2018/091284—ISA/EPO—dated Aug. 29, 2018.
Samsung: "NR-SRS Design for UL Beam Management", 3GPP Draft, 3GPP TSG RAN WG1 Meeting #88, R1-1702940, 3rd Generation Partnership Project (3GPP), Mobile Competence Centre, 650, Route Des Lucioles, F-06921 Sophia-Antipolis Cedex, France, vol. RAN WG1. No. Athens, Greece, Feb. 13-Feb. 17, 2017 Feb. 12, 2017 (Feb. 12, 2017), XP051210083, 4 Pages, Retrieved from the Internet: URL:http://www.3gpp.org/ftp/Meetings_3GPP_SYNC/RAN1/Docs/ [retrieved on Feb. 12, 2017] Sections 1. 3.
Supplementary European Search Report—EP18817108—Search Authority—Munich—dated Jan. 25, 2021.

* cited by examiner

FREQUENCY SELECTIVE UPLINK PRECODING FOR NEW RADIO

CROSS REFERENCE

The present Application is a 371 national phase filing of International Patent Application No. PCT/CN2018/091284 by HAO et al., entitled "FREQUENCY SELECTIVE UPLINK PRECODING FOR NEW RADIO," filed Jun. 14, 2018, which claims priority to International Patent Application No. PCT/CN20171088702 to HAO et. al., entitled "FREQUENCY SELECTIVE UPLINK PRECODING FOR NEW RADIO," filed Jun. 16, 2017, each of which is assigned to the assignee hereof, and hereby incorporated by reference in their entirety.

BACKGROUND

The following relates generally to wireless communication, and more specifically to frequency selective uplink precoding for new radio.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

In some cases, a UE may communicate with a base station via multiple antenna using multiple input, multiple output (MIMO) techniques. For support of MIMO techniques, the UE may transmit reference signals (e.g., sounding reference signals (SRSs)) to the base station. A SRS may help a base station measure received signal power across a wide transmission bandwidth (e.g., for use in frequency dependent scheduling). For each physical antenna, the UE may multiplex and precode multiple reference signals, and each reference signal may be associated with one or more different antenna ports. Precoding may refer to the application of a phase shift to one or more signals such that the signals reach an intended receiver in-phase (e.g., without destructively interfering). In some cases, the same precoder may be applied across the entire transmission bandwidth in an uplink transmission (e.g., a SRS). For example, such a transmission scheme may support low peak to average power (PAPR) for discrete Fourier transform (DFT)-spread-orthogonal frequency division multiplexing (DFT-s-OFDM) waveforms. However, in some cases a UE may be operable to support frequency selective precoding (e.g., in the case that the UE supports transmission of both OFDM waveforms and DFT-s-OFDM waveforms). Some wireless communications networks may support such UEs through the use of codebook-based uplink schemes. However, such codebook-based schemes may limit network flexibility and increase signaling overhead.

SUMMARY

The described techniques relate to improved methods, systems, devices, or apparatuses that support frequency selective uplink precoding for new radio. Generally, the described techniques provide for the use of sub-band-specific reference signal precoding. A user equipment (UE) may apply multiple precoding matrices to a reference signal to generate a set of precoded reference signals and may transmit the precoded reference signals over respective sub-bands within a given reference signal resource set. In some cases, the UE may transmit a different set of precoded reference signals in each of multiple reference signal resource sets. Upon receiving the precoded reference signals, a base station may perform wideband channel estimation for each sub-band in the given reference signal resource set. The base station may compute an average spectral efficiency for each reference signal resource set and may transmit a configuration to the UE. In the case that the UE transmitted multiple sets of precoded reference signals (e.g., one set in each of multiple reference signal resource sets), the second configuration may include an indication of a preferred reference signal resource set. Additionally or alternatively, the second configuration may include a number of layers, precoder information, or a modulation and coding scheme (MCS) for future communications between the UE and base station. In some cases, the precoder information or number of layers may be or represent a transmit rank indicator (TRI), a transmit precoding matrix indicator (TPMI), or a combination thereof. For example, TRI and TPMI may in some cases be jointly encoded (e.g., according to a set of tables). For example, the UE may precode transmissions in a given sub-band with the same precoder used for the given sub-band in the indicated reference signal resource set (e.g., and transmit the transmissions using the indicated precoder information, number of layers, MCS, or a combination thereof).

A method of wireless communication is described. The method may include receiving, from a base station, a configuration of one or more reference signal resource sets comprising one or more reference signal resources, identifying, based at least in part on the indication of the configuration, a reference signal resource of the one or more reference signal resources, wherein the reference signal resource comprises a plurality of sub-bands, applying a first precoding matrix to a reference signal to obtain a first precoded reference signal, the first precoding matrix associated with a first sub-band of the plurality of sub-bands, applying a second precoding matrix to the reference signal to obtain a second precoded reference signal, the second precoding matrix associated with a second sub-band of the plurality of sub-bands, and transmitting the first precoded reference signal during a first symbol period of the first sub-band and transmitting the second precoded reference signal during a second symbol period of the second sub-band.

An apparatus for wireless communication is described. The apparatus may include means for receiving, from a base station, a configuration of one or more reference signal resource sets comprising one or more reference signal resources, means for identifying, based at least in part on the indication of the configuration, a reference signal resource of the one or more reference signal resources, wherein the reference signal resource comprises a plurality of sub-bands, means for applying a first precoding matrix to a reference signal to obtain a first precoded reference signal, the first precoding matrix associated with a first sub-band of the plurality of sub-bands, means for applying a second precoding matrix to the reference signal to obtain a second precoded reference signal, the second precoding matrix associated with a second sub-band of the plurality of sub-bands, and means for transmitting the first precoded reference signal during a first symbol period of the first sub-band and transmitting the second precoded reference signal during a second symbol period of the second sub-band.

Another apparatus for wireless communication is described. The apparatus may include a processor, memory in electronic communication with the processor, and instructions stored in the memory. The instructions may be operable to cause the processor to receive, from a base station, a configuration of one or more reference signal resource sets comprising one or more reference signal resources, identify, based at least in part on the indication of the configuration, a reference signal resource of the one or more reference signal resources, wherein the reference signal resource comprises a plurality of sub-bands, apply a first precoding matrix to a reference signal to obtain a first precoded reference signal, the first precoding matrix associated with a first sub-band of the plurality of sub-bands, apply a second precoding matrix to the reference signal to obtain a second precoded reference signal, the second precoding matrix associated with a second sub-band of the plurality of sub-bands, and transmit the first precoded reference signal during a first symbol period of the first sub-band and transmitting the second precoded reference signal during a second symbol period of the second sub-band.

A non-transitory computer readable medium for wireless communication is described. The non-transitory computer-readable medium may include instructions operable to cause a processor to receive, from a base station, a configuration of one or more reference signal resource sets comprising one or more reference signal resources, identify, based at least in part on the indication of the configuration, a reference signal resource of the one or more reference signal resources, wherein the reference signal resource comprises a plurality of sub-bands, apply a first precoding matrix to a reference signal to obtain a first precoded reference signal, the first precoding matrix associated with a first sub-band of the plurality of sub-bands, apply a second precoding matrix to the reference signal to obtain a second precoded reference signal, the second precoding matrix associated with a second sub-band of the plurality of sub-bands, and transmit the first precoded reference signal during a first symbol period of the first sub-band and transmitting the second precoded reference signal during a second symbol period of the second sub-band.

Some examples of the method, apparatus, and non-transitory computer-readable medium described above may further include processes, features, means, or instructions for determining at least one of the first precoding matrix and the second precoding matrix based at least in part on a reciprocity between a downlink signal received at the UE and an uplink signal sent from the UE.

In some examples of the method, apparatus, and non-transitory computer-readable medium described above, applying the first precoding matrix and the second precoding matrix comprises applying the first precoding matrix to the reference signal using a first set of antenna ports and applying the second precoding matrix to the reference signal using the first set of antenna ports or a second set of antenna ports.

In some examples of the method, apparatus, and non-transitory computer-readable medium described above, a first bandwidth of the first sub-band may be the same as a second bandwidth of the second sub-band.

Some examples of the method, apparatus, and non-transitory computer-readable medium described above may further include processes, features, means, or instructions for receiving, from the base station, a second configuration of the one or more reference signal resource sets. Some examples of the method, apparatus, and non-transitory computer-readable medium described above may further include processes, features, means, or instructions for identifying, based at least in part on the second configuration, a second reference signal resource of the one or more reference signal resources, the second reference signal resource comprising a second plurality of sub-bands. Some examples of the method, apparatus, and non-transitory computer-readable medium described above may further include processes, features, means, or instructions for applying a third precoding matrix to a second reference signal to obtain a third precoded reference signal, the third precoding matrix associated with a first sub-band of the second plurality of sub-bands. Some examples of the method, apparatus, and non-transitory computer-readable medium described above may further include processes, features, means, or instructions for applying a fourth precoding matrix to the second reference signal to obtain a fourth precoded reference signal, the fourth preceding matrix associated with a second sub-band of the second plurality of sub-bands. Some examples of the method, apparatus, and non-transitory computer-readable medium described above may further include processes, features, means, or instructions for transmitting the third precoded reference signal during a first symbol period of the first sub-band of the second plurality of sub-bands and transmitting the fourth precoded reference signal during a second symbol period of the second sub-band of the second plurality of sub-bands.

In some examples of the method, apparatus, and non-transitory computer-readable medium described above, the first sub-band of the plurality of sub-bands and the first sub-band of the second plurality of sub-bands may have a same bandwidth.

In some examples of the method, apparatus, and non-transitory computer-readable medium described above, the first sub-band of the plurality of sub-bands and the first sub-band of the second plurality of sub-bands may have a different bandwidth.

In some examples of the method, apparatus, and non-transitory computer-readable medium described above, the plurality of sub-bands and the second plurality of sub-bands may have a same number of sub-bands.

In some examples of the method, apparatus, and non-transitory computer-readable medium described above, the plurality of sub-bands and the second plurality of sub-bands may have a different number of sub-bands.

In some examples of the method, apparatus, and non-transitory computer-readable medium described above, the plurality of sub-bands and the second plurality of sub-bands include a same set of sub-bands.

In some examples of the method, apparatus, and non-transitory computer-readable medium described above, the plurality of sub-bands and the second plurality of sub-bands include a different set of sub-bands.

In some examples of the method, apparatus, and non-transitory computer-readable medium described above, the first and second precoded reference signals may be transmitted during a first transmission time interval (TTI) and the third and fourth precoded reference signals may be transmitted during the first TTI or during a second TTI.

Some examples of the method, apparatus, and non-transitory computer-readable medium described above may further include processes, features, means, or instructions for receiving, from the base station, a third configuration based at least in part on at least one of the first, second, third, or fourth precoded reference signals, the third configuration comprising at least one of a sounding resource indicator (SRI), precoder information, a number of layers, or a MCS. Some examples of the method, apparatus, and non-transitory computer-readable medium described above may further include processes, features, means, or instructions for communicating with the base station over at least one of the first sub-band of the plurality of sub-bands using the first precoding matrix, the second sub-band of the plurality of sub-bands using the second precoding matrix, the first sub-band of the second plurality of sub-bands using the third precoding matrix, or the second sub-band of the second plurality of sub-bands using the fourth precoding matrix based at least in part on the third configuration.

In some examples of the method, apparatus, and non-transitory computer-readable medium described above, a precoding granularity of the first precoding matrix is greater than or equal to a number of resource blocks (RBs) in the first sub-band and the precoding granularity of the second precoding matrix is greater than or equal to a number of RBs in the second sub-band.

In some examples of the method, apparatus, and non-transitory computer-readable medium described above, the reference signal comprises a sounding reference signal (SRS) and the second configuration may be received via downlink control signaling associated with an uplink grant.

Some examples of the method, apparatus, and non-transitory computer-readable medium described above may further include processes, features, means, or instructions for selecting the reference signal resource set based at least in part on the SRI. Some examples of the method, apparatus, and non-transitory computer-readable medium described above may further include processes, features, means, or instructions for communicating with the base station over at least one of the first sub-band of the plurality of sub-bands using the first precoding matrix and the second sub-band of the plurality of sub-bands using the second preceding matrix.

Some examples of the method, apparatus, and non-transitory computer-readable medium described above may further include processes, features, means, or instructions for selecting the second reference signal resource set based at least in part on the SRI. Some examples of the method, apparatus, and non-transitory computer-readable medium described above may further include processes, features, means, or instructions for communicating with the base station over at least one of the first sub-band of the second plurality of sub-bands using the third precoding matrix and the second sub-band of the second plurality of sub-bands using the fourth precoding matrix.

Some examples of the method, apparatus, and non-transitory computer-readable medium described above may further include processes, features, means, or instructions for receiving, from a base station, a report based at least in part on the first and second preceded reference signals, the report comprising at least one of a number of layers, precoder information, or a MCS. Some examples of the method, apparatus, and non-transitory computer-readable medium described above may further include processes, features, means, or instructions for communicating with the base station over at least one of the first sub-band using the first preceding matrix and the second sub-band using the second preceding matrix based at least in part on the report.

In some examples of the method, apparatus, and non-transitory computer-readable medium described above, the reference signal comprises a SRS and the report may be received via downlink control signaling associated with an uplink grant.

In some examples of the method, apparatus, and non-transitory computer-readable medium described above, the first symbol period occurs prior to the second symbol period. In some examples of the method, apparatus, and non-transitory computer-readable medium described above, the first precoding matrix and the second precoding matrix comprise a same precoding matrix. In some examples of the method, apparatus, and non-transitory computer-readable medium described above, the first precoding matrix and the second precoding matrix comprise a different precoding matrix.

In some examples of the method, apparatus, and non-transitory computer-readable medium described above, the first sub-band and the second sub-band have a combined bandwidth that is greater than or equal to a bandwidth of the number of RBs. In some examples of the method, apparatus, and non-transitory computer-readable medium described above, the first sub-band and the second sub-band have a same bandwidth. In some examples of the method, apparatus, and non-transitory computer-readable medium described above, the first sub-band and the second sub-band have a different bandwidth.

A method of wireless communication is described. The method may include identifying a reference signal resource of one or more reference signal resources, the reference signal resource comprising a plurality of sub-bands, transmitting, to a UE, a first configuration of one or more reference signal resource sets comprising the one or more reference signal resources, the first configuration identifying the reference signal resource, receiving a first reference signal during a first symbol period of a first sub-band of the plurality of sub-bands and receiving a second reference signal during a second symbol period of a second sub-band of the plurality of sub-bands, computing respective channel estimates of the first sub-band and the second sub-band, and transmitting, to the UE, a second configuration comprising at least one of a SRI, a number of layers, a precoding information, or a MCS based at least in part on the respective channel estimates.

An apparatus for wireless communication is described. The apparatus may include means for identifying a reference signal resource of one or more reference signal resources, the reference signal resource comprising a plurality of sub-bands, means for transmitting, to a UE, a first configuration of one or more reference signal resource sets comprising the one or more reference signal resources, the first configuration identifying the reference signal resource, means for receiving a first reference signal during a first symbol period of a first sub-band of the plurality of sub-bands and receiving a second reference signal during a second symbol period of a second sub-band of the plurality of sub-bands, means for computing respective channel estimates of the first sub-band and the second sub-band, and means for transmitting, to the UE, a second configuration comprising at least one of a SRI, a number of layers, a precoding information, or a MCS based at least in part on the respective channel estimates.

Another apparatus for wireless communication is described. The apparatus may include a processor, memory in electronic communication with the processor, and instructions stored in the memory. The instructions may be operable to cause the processor to identify a reference signal resource of one or more reference signal resources, the reference signal resource comprising a plurality of sub-bands, transmit, to a LTE, a first configuration of one or more reference signal resource sets comprising the one or more reference signal resources, the first configuration identifying the reference signal resource, receive a first reference signal during a first symbol period of a first sub-band of the plurality of sub-bands and receiving a second reference signal during a second symbol period of a second sub-band of the plurality of sub-bands, compute respective channel estimates of the first sub-band and the second sub-band, and transmit, to the UE, a second configuration comprising at least one of a SRI, a number of layers, a precoding information, or a MCS based at least in part on the respective channel estimates.

A non-transitory computer readable medium for wireless communication is described. The non-transitory computer-readable medium may include instructions operable to cause a processor to identify a reference signal resource of one or more reference signal resources, the reference signal resource comprising a plurality of sub-bands, transmit, to a UE, a first configuration of one or more reference signal resource sets comprising the one or more reference signal resources, the first configuration identifying the reference signal resource, receive a first reference signal during a first symbol period of a first sub-band of the plurality of sub-bands and receiving a second reference signal during a second symbol period of a second sub-band of the plurality of sub-bands, compute respective channel estimates of the first sub-band and the second sub-band, and transmit, to the UE, a second configuration comprising at least one of a SRI, a number of layers, a precoding information, or a MCS based at least in part on the respective channel estimates.

Some examples of the method, apparatus, and non-transitory computer-readable medium described above may further include processes, features, means, or instructions for performing independent channel estimation for the first sub-band during the first symbol period based on the first reference signal and the second sub-band during the second symbol period based on the second reference signal.

Some examples of the method, apparatus, and non-transitory computer-readable medium described above may further include processes, features, means, or instructions for identifying a second reference signal resource of the one or more reference signal resources, the second reference signal resource comprising a second plurality of sub-bands. Some examples of the method, apparatus, and non-transitory computer-readable medium described above may further include processes, features, means, or instructions for transmitting, to the UE, a third configuration of the one or more reference signal resource sets, the third configuration identifying the second reference signal resource. Some examples of the method, apparatus, and non-transitory computer-readable medium described above may further include processes, features, means, or instructions for receiving a third reference signal during a first symbol period of a first sub-band of the second plurality of sub-bands and receiving a fourth reference signal during a second symbol period of a second sub-band of the second plurality of sub-bands. Some examples of the method, apparatus, and non-transitory computer-readable medium described above may further include processes, features, means, or instructions for computing second respective channel estimates of the first and second sub-band of the second plurality of sub-bands.

Some examples of the method, apparatus, and non-transitory computer-readable medium described above may further include processes, features, means, or instructions for determining a preferred reference signal resource set based at least in part on the respective channel estimates and the second respective channel estimates. Some examples of the method, apparatus, and non-transitory computer-readable medium described above may further include processes, features, means, or instructions for transmitting the second configuration based at least in part on the determining, wherein the second configuration comprises the SRI indicating the preferred reference signal resource set.

Some examples of the method, apparatus, and non-transitory computer-readable medium described above may further include processes, features, means, or instructions for determining the SRI, the number of layers, the precoder information, or the MCS of the reference signal resource set, wherein the report may be transmitted via downlink control signaling associated with an uplink grant.

In some examples of the method, apparatus, and non-transitory computer-readable medium described above, the first sub-band of the plurality of sub-bands and the first sub-band of the second plurality of sub-bands may have a same bandwidth. In some examples of the method, apparatus, and non-transitory computer-readable medium described above, the first sub-band of the plurality of sub-bands and the first sub-band of the second plurality of sub-bands may have a different bandwidth.

In some examples of the method, apparatus, and non-transitory computer-readable medium described above, the plurality of sub-bands and the second plurality of sub-bands may have a same number of sub-bands. In some examples of the method, apparatus, and non-transitory computer-readable medium described above, the plurality of sub-bands and the second plurality of sub-bands may have a different number of sub-bands.

In some examples of the method, apparatus, and non-transitory computer-readable medium described above, the plurality of sub-bands and the second plurality of sub-bands include a same set of sub-bands. In some examples of the method, apparatus, and non-transitory computer-readable medium described above, the plurality of sub-bands and the second plurality of sub-bands include a different set of sub-bands.

In some examples of the method, apparatus, and non-transitory computer-readable medium described above, the first and second reference signals may be received in a first TTI and the third and fourth reference signals may be received in the first TTI or a second TTI.

Some examples of the method, apparatus, and non-transitory computer-readable medium described above may further include processes, features, means, or instructions for receiving, from a second UE, a respective reference signal during each of the first symbol period of the first sub-band of the plurality of sub-bands, the second symbol period of the second sub-band of the plurality of sub-bands, the first symbol period of the first sub-band of the second plurality of sub-bands, and the second symbol period of the second sub-band of the second plurality of sub-bands. Some examples of the method, apparatus, and non-transitory computer-readable medium described above may further include processes, features, means, or instructions for computing third respective channel estimates of the plurality of sub-bands and fourth respective channel estimates of the second plurality of sub-bands based at least in part on a respective precoding matrix applied to each respective precoded reference signal. Some examples of the method, apparatus, and non-transitory computer-readable medium described above may further include processes, features, means, or instructions for transmitting, to the second UE, a second report comprising at least one of a second SRI, a second number of layers, second precoder information, or a second MCS based at least in part on the third respective channel estimates and the fourth respective channel estimates.

In some examples of the method, apparatus, and non-transitory computer-readable medium described above, each of the first reference signal and the second reference signal comprises a SRS. In some examples of the method, apparatus, and non-transitory computer-readable medium described above, the first symbol period occurs prior to the second symbol period.

Some examples of the method, apparatus, and non-transitory computer-readable medium described above may further include processes, features, means, or instructions for receiving, from a second UE, a third reference signal during the first symbol period of the first sub-band of the plurality of sub-bands and receiving, from the second UE, a fourth reference signal during the second symbol period of the second sub-band of the plurality of sub-bands. Some examples of the method, apparatus, and non-transitory computer-readable medium described above may further include processes, features, means, or instructions for computing second respective channel estimates of the first sub-band and the second sub-band. Some examples of the method, apparatus, and non-transitory computer-readable medium described above may further include processes, features, means, or instructions for transmitting a third configuration comprising at least one of second precoder information, a second number of layers, a second SRI, or a second MCS to the second UE based at least in part on the second respective channel estimates.

DETAILED DESCRIPTION

Figure 1:
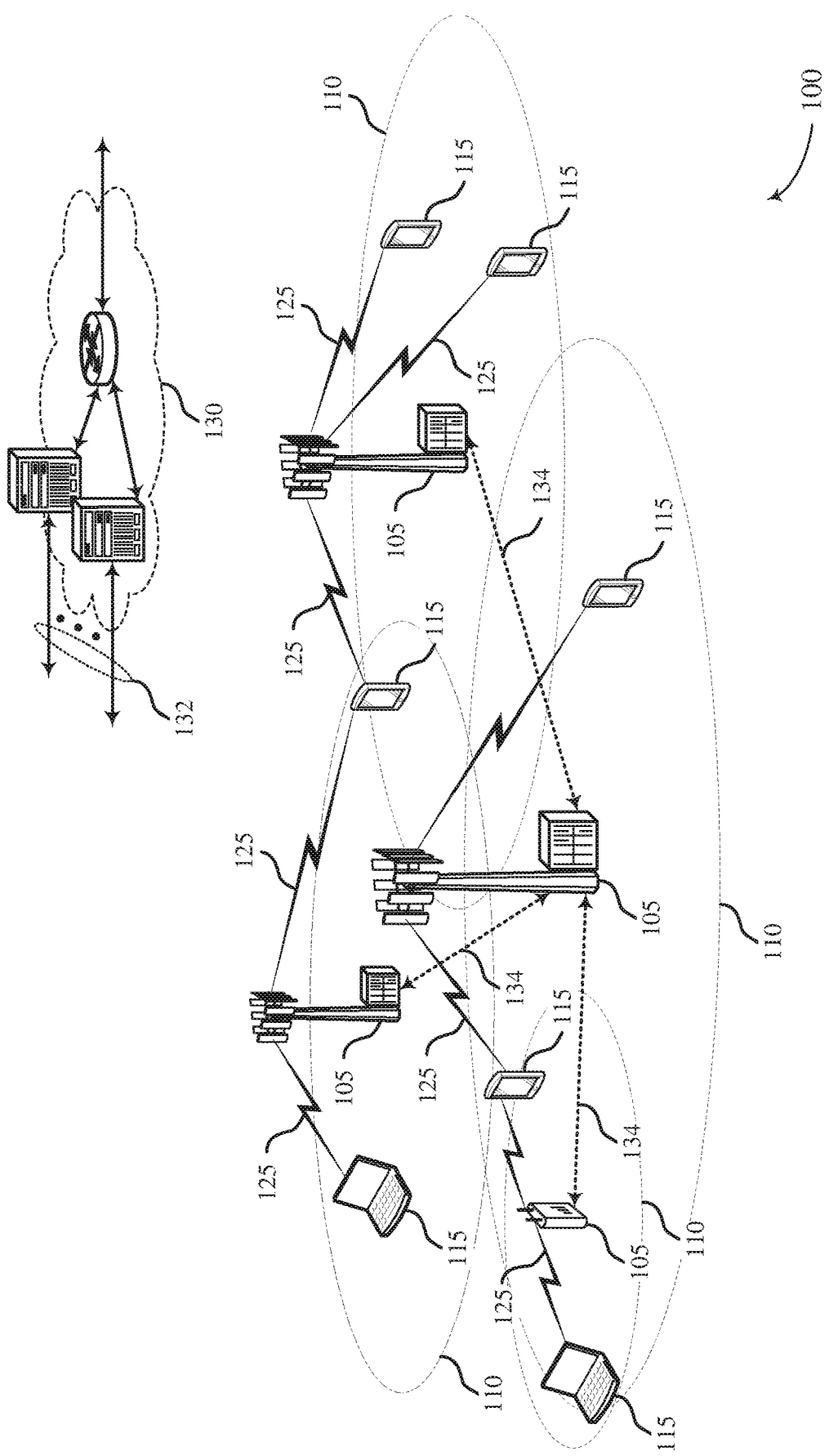
FIG. 1 illustrates an example of a system for wireless communication that supports frequency selective uplink precoding for new radio in accordance with aspects of the present disclosure.

A wireless communications system may support communication between a base station and a user equipment (UE). Specifically, the wireless communications system may support downlink transmissions from the base station to the UE and uplink transmissions from the UE to the base station. Uplink transmissions may include data, control signals, and reference signals (e.g., sounding reference signals (SRS), etc.). In some cases, a UE may transmit reference signals via multiple antennas using multiple-input, multiple-output (MIMO) techniques. Different reference signal waveforms may be multiplexed over a set of frequency resources (e.g., using frequency division multiplexing (FDM) and/or time division multiplexing (TDM)) for a given uplink transmission on an antenna. For example, a UE may identify respective single-carrier reference signal streams to be transmitted to a base station, and these streams may be precoded and multiplexed for the transmission. In some cases, the same precoder may be applied across the entire transmission bandwidth in an uplink transmission (e.g., for a SRS). Alternatively, a UE may be operable to support frequency selective precoding (e.g., in the case that the UE supports transmission of both discrete Fourier transform-spread-orthogonal frequency division multiplexing (DFT-s-OFDM) waveforms and OFDM waveforms). Some wireless communications networks may support such UEs through the use of codebook-based uplink schemes. However, such codebook-based schemes may limit network flexibility and increase signaling overhead.

As described herein, some wireless communications systems may support efficient techniques for non-codebook-based frequency selective uplink precoding. Specifically, a UE may apply multiple precoding matrices to a reference signal to generate a set of precoded reference signals and may transmit the preceded reference signals over respective sub-bands within a given reference signal resource set. Upon receiving the precoded reference signals, a base station may perform wideband channel estimation for each sub-band in the given reference signal resource set. Additionally or alternatively, the base station may compute an average spectral efficiency for each reference signal resource set (e.g., in the case that multiple sets of reference signals are transmitted in respective reference signal resource sets). Based on such processing, the base station may report a sounding resource indicator (SRI), a number of layers, a modulation and coding scheme (MCS), precoder information, or any combination thereof for future communications between the UE and base station. For example, the UE may precode subsequent transmissions in a given sub-band with the same precoder used for the given sub-band in the indicated reference signal resource set (e.g., using the indicated number of layers, MCS, precoder information, or SRI).

Aspects of the disclosure are initially described in the context of a wireless communications system. These and other features are further illustrated by and described with reference to various block diagrams, transmission schemes, and process flows. Aspects of the disclosure are further illustrated by and described with reference to apparatus diagrams, system diagrams, and flowcharts that relate to frequency selective uplink precoding for new radio.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices. Wireless communications system 100 may enable or support non-codebook-based frequency selective uplink precoding as described herein.

Base stations 105 may wirelessly communicate with UEs 115 via one or more base station antennas. Each base station 105 may provide communication coverage for a respective geographic coverage area 110. Communication links 125 shown in the wireless communications system 100 may include uplink transmissions from a UE 115 to a base station 105, or downlink transmissions, from a base station 105 to a UE 115. Control information may be multiplexed on an uplink channel physical uplink control channel (PUCCH)) or downlink channel (e.g., physical downlink control channel (PDCCH)) according to various techniques. Similarly, data may be multiplexed on an uplink channel (e.g., physical uplink shared channel (PUSCH)) or downlink channel (e.g., physical downlink shared channel (PDSCH)) according to various techniques. Control information and data may be multiplexed on a downlink channel, for example, using TDM techniques, FDM techniques, or hybrid TDM-EDM techniques.

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independently of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105, next generation NodeBs (gNBs) 105, etc.

In some cases, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid Automatic Repeat Request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105, or core network 130 supporting radio bearers for user plane data. At the physical (PHY) layer, transport channels may be mapped to physical channels.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "channel," and "sub-band" may be used interchangeably herein. A UE 115 may be configured with multiple downlink CCs and one or more uplink CCs for carrier aggregation. Carrier aggregation may be used with both frequency division duplex (FDD) and time division duplex (TDD) component carriers.

In some cases, wireless communications system 100 may utilize enhanced component carriers (eCCs). An eCC may be characterized by one or more features including: wider bandwidth, shorter symbol duration, shorter transmission time intervals (TTIs), and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration may be associated with increased subcarrier spacing. A TTI in an eCC may consist of one or multiple symbols. In some cases, the TTI duration (that is, the number of symbols in a TTI) may be variable. In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds).

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on FDD, TDD, or a combination of both.

Wireless communications system 100 may operate in an ultra-high frequency (UHF) region using frequency bands from 300 MHz to 3 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. Wireless communications system 100 may also operate in a super high frequency (SHF) region using frequency bands from 3 GHz to 30 GHz, otherwise known as the centimeter band. In some cases, wireless communications system 100 may also utilize extremely high frequency (EHF) portions of the spectrum (e.g., from 30 GHz to 300 GHz), also known as the millimeter band. Systems that use this region may be referred to as millimeter wave (mmW) systems. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions. Techniques disclosed herein may be employed across transmissions that use one or more different frequency regions.

Wireless communications system 100 may support millimeter wave (mmW) communications between UEs 115 and base stations 105. Devices operating in mmW, SHF, of EHF bands may have multiple antennas to allow beamforming. Beamforming may also be employed outside of these frequency bands (e.g., in any scenario in which increased cellular coverage is desired). That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the signals. Each of these beams may be referred to as a receive beam in aspects of the present disclosure.

Multiple-input multiple-output (MIMO) wireless systems use a transmission scheme between a transmitter (e.g., a base, station 105) and a receiver (e.g., a UE 115), where both transmitter and receiver are equipped with multiple antennas. In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may use multiple antennas or antenna arrays to conduct beamforming operations for directional communications with a UE 115.

Elements of wireless communications system 100 (e.g., UE 115 and base station 105) may utilize digital signal processors (DSPs) implementing Fourier transforms. A DFT may transform discrete time-domain data sets into a discrete frequency-domain representation. The discrete frequency-domain representation may be used to map signals to subcarriers in the frequency domain. Further, an inverse DFT (IDFT) may be used to transform the discrete frequency representation (e.g., information represented in subcarriers) into a discrete time representation (e.g., a signal carrying information in the time domain). For example, a transmitter may perform a DFT to map information to subcarriers, and subsequently perform an IDFT to transform the information contained in subcarriers into a signal varying in time to convey the original information.

A UE 115 may transmit SRSs to a base station 105 to allow the base station 105 to estimate uplink channel quality over a wide bandwidth. SRSs may be transmitted by UE 115 using a predetermined sequence (e.g., a Zadoff-Chu sequence) known by the base station 105. An SRS transmission may not be associated with transmission of data on another channel, and may be transmitted periodically on a wide bandwidth (e.g., a bandwidth including more subcarriers than are allocated for uplink data transmission). An SRS may also be scheduled on multiple antenna ports while still being considered as a single SRS transmission. An SRS transmission may be categorized as a Type 0 (periodically transmitted at equally spaced intervals) SRS or as a Type 1 (aperiodic) SRS. Data gathered by a base station 105 from an SRS may be used to inform an uplink scheduler. A base station 105 may also utilize an SRS to check timing alignment status and send time alignment commands to the UE 115.

In some cases, a UE 115 may transmit reference signals (e.g., SRSs) to a base station 105 in an uplink transmission via multiple antennas using MIMO techniques. Prior to transmitting the signals, the UE 115 may precode the symbols of the reference signals and multiplex the symbols on a set of time and frequency resources. For instance, different reference signal waveforms (e.g., different DFT-s-OFDM waveforms) associated with different precoded reference signals may be multiplexed over a set of frequency resources (e.g., using FDM) for an uplink transmission. In accordance with the described techniques, wireless communications system 100 may support frequency selective uplink precoding for new radio. That is, a UE 115 may transmit one or more sets of precoded reference signals, where each set includes multiple precoded reference signals, and each precoded reference signal is transmitted over a corresponding sub-band. A base station 105 may process the sets of precoded reference signals to determine a preferred set of communication parameters (e.g., sub-band precoders, MCS, number of layers, etc.).

Figure 2:
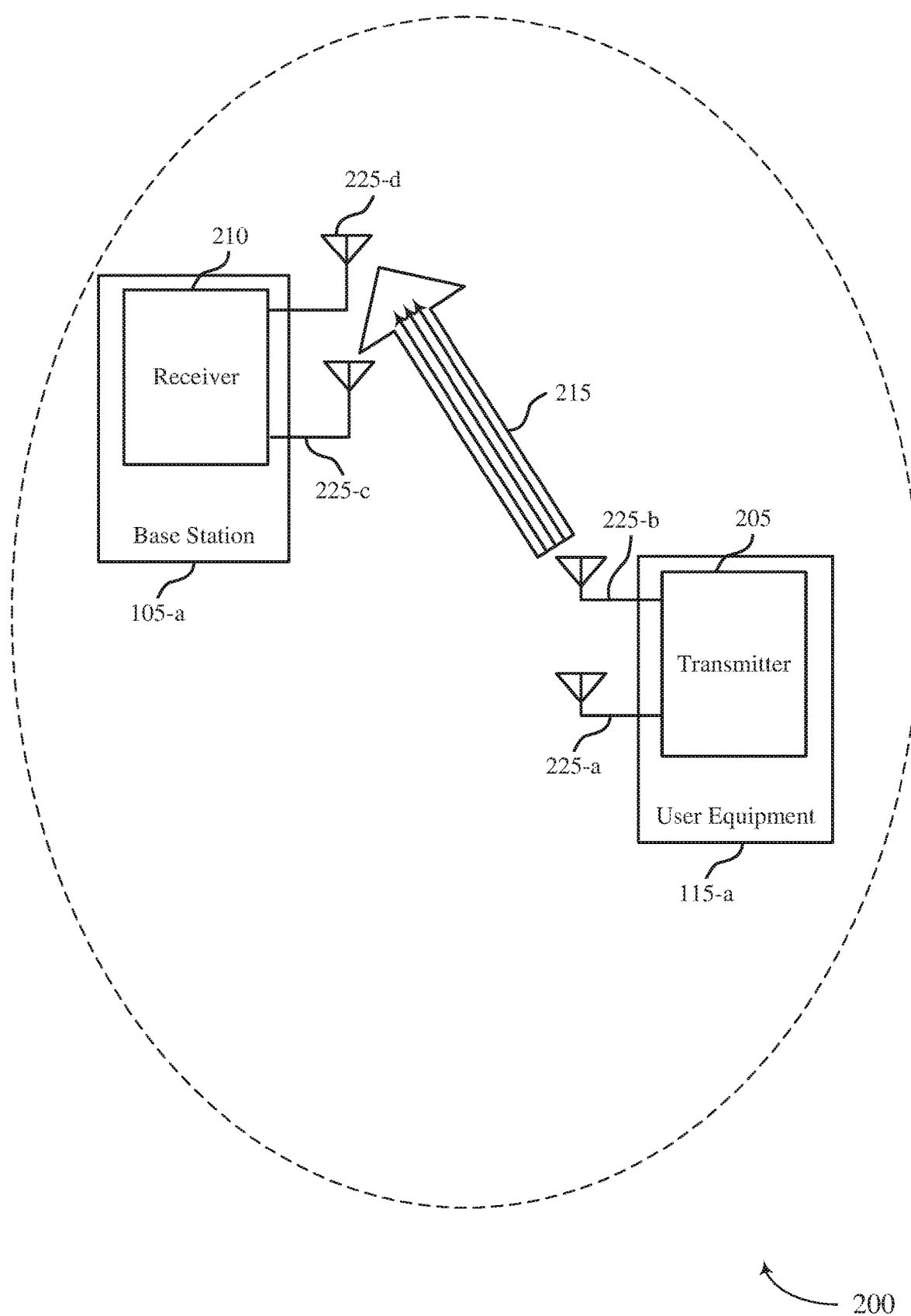
FIG. 2 illustrates an example of a wireless communication system that supports frequency selective uplink precoding for new radio in accordance with aspects of the present disclosure.

FIG. 2 illustrates an example of a wireless communications system 200 that supports frequency selective uplink precoding for new radio in accordance with aspects of the present disclosure. Wireless communications system 200 includes base station 105-a, which may be an example of a base station 105 described with reference to FIG. 1. Wireless communication system also includes UE 115-a, which may be an example of a UE 115 described with reference to FIG. 1. UE 115-a may be configured with a transmitter 205 used to transmit signals to base station 105-a, and base station 105-a may be configured with a receiver 210 used to receive signals from UE 115-a.

UE 115-a may communicate with base station 105-a via multiple antennas 225 using MIMO techniques. In such cases, a UE 115-a may transmit multiple parallel data streams 215 to base station 105-a (e.g., to increase the data rate within wireless communications system 200) using transmit antenna 225-a and transmit antenna 225-b. Similarly, base station 105-a may receive multiple parallel data streams 215 using receive antenna 225-c and receive antenna 225-d. While two transmit antennas 225 and two receive antennas 225 are illustrated, it is to be understood that any suitable number of antennas may be used at either communicating device (e.g., four receive antennas 225 and three transmit antennas 225, etc.). In some cases, the quality of a channel used to transmit each parallel data stream 215 may depend on the multipath environment, precoding, interference, etc. Precoding may refer to the application of weighting (e.g., phase shifting, amplitude scaling, etc.) to a set of signals such that the superposition of these signals at a receiving device improves the received signal quality (e.g., improves the signal-to-interference and noise ratio (SINR) of a transmission). In order to support efficient scheduling of resources, a base station 105-a may allocate resources based on an estimate of the quality of different channels (e.g., which estimate(s) may be based on the quality of one or more reference signals).

To facilitate channel estimation, UE 115-a may transmit reference signals (e.g., SRSs) over a wide bandwidth. SRS transmissions may allow the base station 105-a to estimate the quality of a channel used to transmit data via antennas 225. Base station 105-a may then use the measured information from SRS transmissions for frequency or spatial layer-dependent scheduling. The timing of the SRS transmissions may be controlled by the base station 105-a. Additionally, base station 105-a may control the transmission bandwidth using cell-specific parameters and mobile-specific parameters (e.g., the SRS bandwidth configuration). In wireless communications system 200, UE 115-a may be configured (e.g., via higher layer signaling) to transmit the SRS on a suitable number of antenna ports of a serving cell (e.g., ports 0, 1, 2, and 4). That is, reference signals may be spatially multiplexed on channels used to transmit data via antennas 225 to allow base station 105-a to obtain an accurate estimate of the quality of channels used for MIMO data transmissions.

In some examples, base station 105-a may configure UE 115-a with a SRS configuration (e.g., a number of bundled RBs). For example, base station 105-a may configure UE 115-a with N RBs, where N is a positive integer. When UE 115-a transmits SRS, a first precoding matrix may be applied for a first sub-band, and a second precoding matrix may be applied for a second sub-band. In accordance with aspects of the present disclosure, the bandwidths of the first sub-band and the second sub-band may be based on the SRS configuration. For example, the bandwidth of the first and second sub-bands (e.g., together or independently) may be greater than or equal to N RBs. Base station 105-a may bundle at least N RBs together when performing channel measurement. In some examples, the configuration of the number of bundled RBs may be per SRS resource. Alternatively, the configuration of the number of bundled RBs may be per SRS resource set (e.g., where a SRS resource set may include multiple SRS resources). In some cases, each SRS resource may have a specific configuration of the number of bundled RBs.

Figure 3:
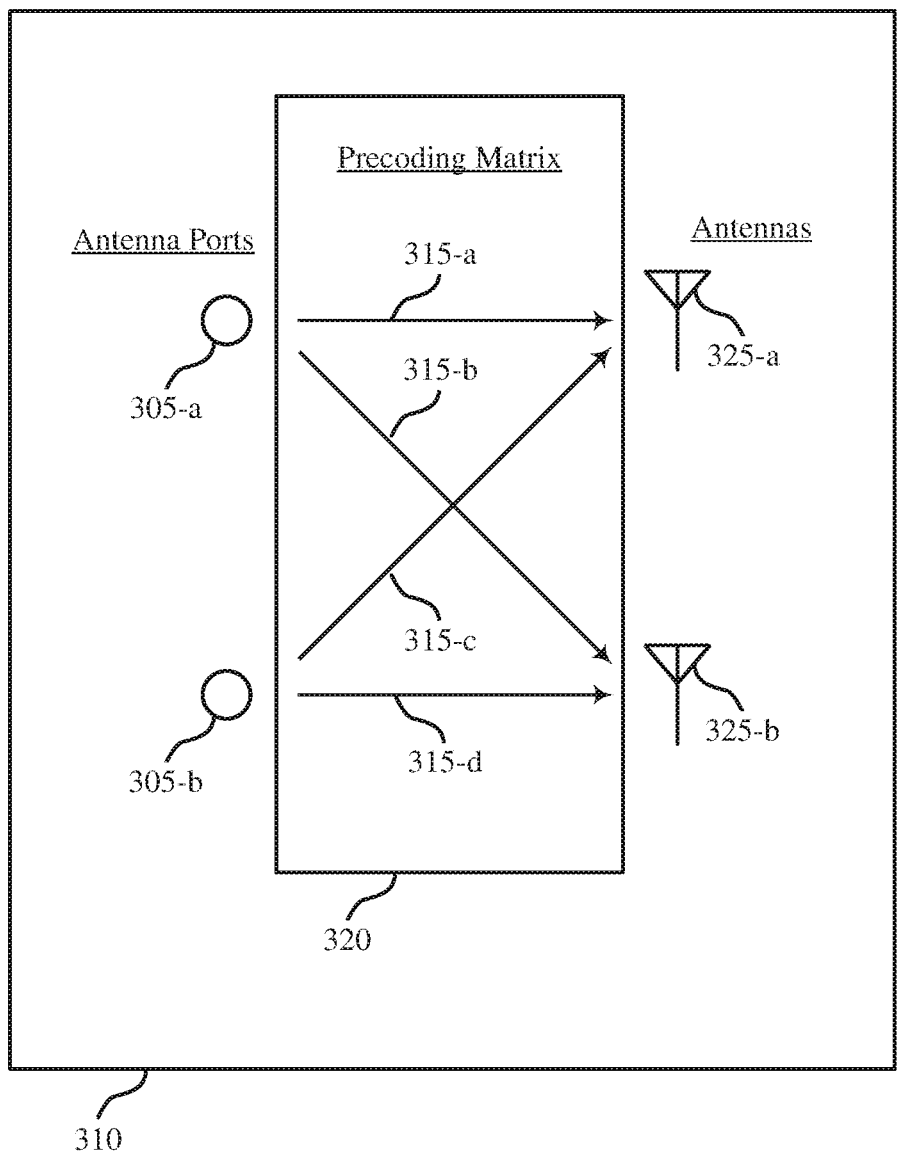
FIG. 3 illustrates a block diagram of a wireless device that supports frequency selective uplink precoding for new radio in accordance with aspects of the present disclosure.

FIG. 3 illustrates a block diagram 300 of a wireless device 310 that supports frequency selective uplink precoding for new radio in accordance with aspects of the present disclosure. Wireless device 310 may be an example of a UE 115 (or a base station 105) described with reference to FIGS. 1 and 2. Wireless device 310 may contain two logical antenna ports 305 which are connected to physical antennas 325-a and 325-b. Physical antennas 325-a and 325-b may be examples of the transmit antennas 225-a and 225-b described with reference to FIG. 2. In the present example, a precoding matrix is applied to signals at logical antenna ports 305 using precoding matrix 320 (e.g., by matrix multiplication) and these signals are mapped to the physical antennas 325.

The present example illustrates a single precoding matrix 320. However, multiple precoding matrices may be used (e.g., a different precoding matrix may be applied to different frequency bands, tones, physical resource blocks (PRBs), physical resource groups (PRGs), etc.). Although displayed as having two logical antenna ports 305 and two physical antennas 325, any suitable number of ports or antennas may be used without deviating from the scope of the present disclosure. In some cases, the number of logical antenna ports 305 array be less than or equal to the number of physical antennas 325. Accordingly, the number of logical antenna ports 305 and physical antennas 325 need not be equal. Logical antenna ports 305 may in some examples be referred to as SRS ports or physical antenna ports without deviating from the scope of the present disclosure. For example, a physical antenna port may be or include a radio frequency (RF) chain, a physical antenna element, or a virtual antenna formed by one or more physical antenna elements.

In the present example, each logical antenna port 305 may have one or more respective reference signals associated with it. In some cases, the precoding matrix 320 may be an n-by-m matrix, connecting 'm' logical antenna ports 305 to 'n' physical antennas 325 (e.g., by matrix multiplication). Accordingly, precoding matrix 320 may apply appropriate phase shifts and/or amplitude modulation to the respective reference signals of logical antenna ports 305. As an example, a reference signal of logical antenna port 305-a may be modified (e.g., phase shifted or otherwise altered) according to precoding phasor 315-a before being mapped to physical antenna 325-a. In some examples, precoding phasor 315-a may be a complex number such that the matrix multiplication achieves frequency and amplitude modulation. Similarly, a reference signal at logical antenna port 305-b may be modified according to precoding phasor 315-c before being combined with the precoded reference signal from logical antenna port 305-a for transmission via physical antenna 325-a. The reference signals associated with logical antenna ports 305-a and 305-b may be precoded using similar techniques before being mapped to physical antenna 325-b (e.g., by precoding phasors 315-b and 315-d, respectively). In aspects of the present disclosure, physical antennas 325-a and/or 325-b may be operable to transmit multiple precoded reference signals over respective sub-bands (e.g., such that each sub-band is associated with a respective precoding matrix 320).

Figure 4:
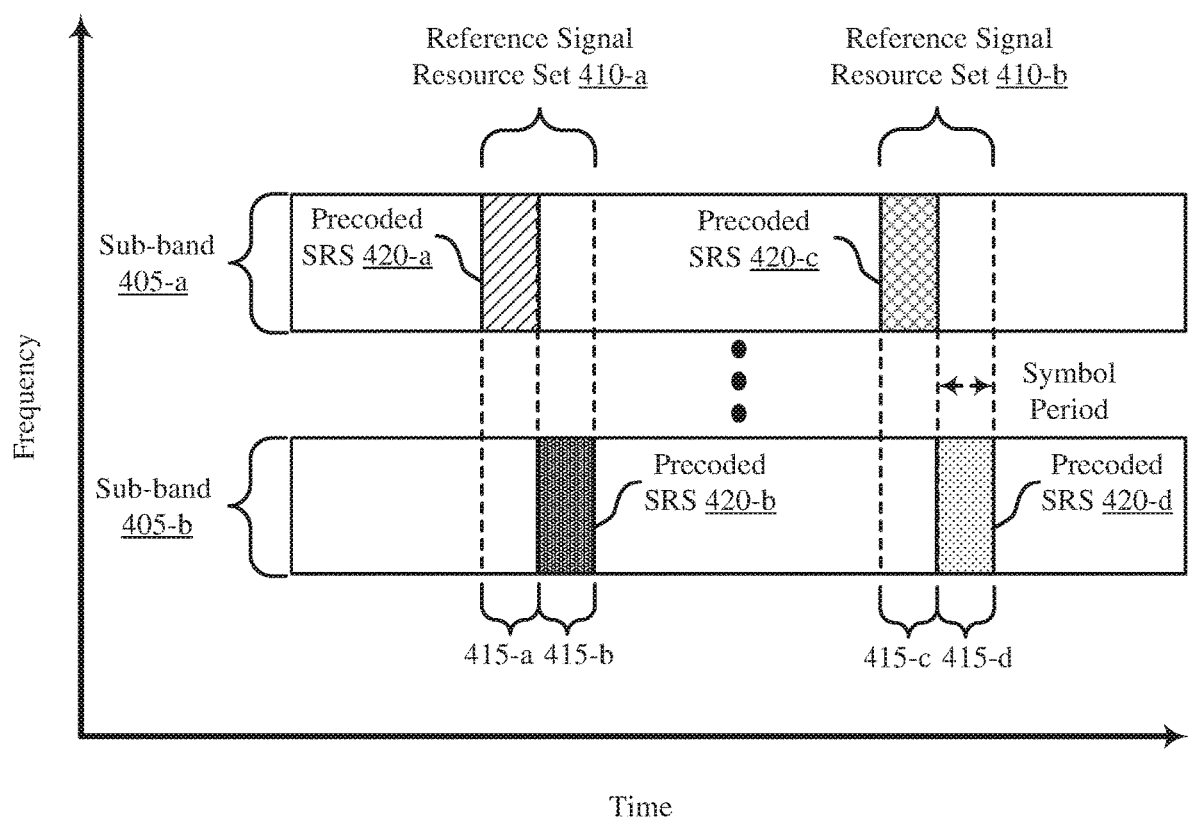
FIG. 4 illustrates an example of a transmission scheme that supports frequency selective uplink precoding for new radio in accordance with aspects of the present disclosure.

FIG. 4 illustrates an example of a transmission scheme 400 that supports frequency selective uplink precoding for new radio in accordance with various aspects of the present disclosure. In some examples, transmission scheme 400 may implement aspects of wireless communications system 100. Transmission scheme 400 may be implemented at a base station 105 or UE 115 as described with reference to FIGS. 1 and 2.

Transmission scheme 400 includes a plurality of sub-bands 405. Although two sub-bands 405 are illustrated, it is to be understood that the described techniques may be extended to arty suitable number of sub-bands 405. Further, sub-bands 405-a and 405-b may be adjacent in the frequency domain or they may be distributed (e.g., separated in frequency by one or more sub-bands). In some cases, the scheduling of sub-bands 405 may be controlled by a base station 105.

Scheduling for each sub-band 405 may be based on time divisions (e.g., symbol periods 415). Each symbol period 415 (e.g., or a combination of symbol periods 415) may be an example of a TTI. In some cases, a UE 115 may identify one or more reference signal resource sets 410 over which to transmit precoded reference signals. Each reference signal resource set 410 may span multiple sub-bands 405 and symbol periods 415. In some cases, the symbol periods 415 of the reference signal resource sets 410 may be the final symbol periods 415 in a given slot.

In accordance with the described techniques, a UE 115 may transmit (e.g., and a base station 105 may receive) precoded SRSs via sub-band 405 hopping. In each sub-band 405, the SRS may be precoded via a sub-band-specific precoder (e.g., a preceding matrix 320 as described with reference to FIG. 3). In some cases, the sub-band-specific precoder may be based at least in part on downlink-uplink reciprocity. For example, a UE 115 may precode the reference signals for each sub-band 405 based at least in part on a prior downlink transmission.

In aspects, a 115 may transmit one sub-band-specific precoded SRS per symbol period 415. For example, in reference signal resource set 410-a, the UE 115 may transmit first precoded. SRS 420-a in symbol period 415-a and second precoded SRS 420-b in symbol period 415-b. Such a transmission scheme may allow the precoded SRSs 420 to be transmitted using DFT-s-OFDM waveforms (e.g., to provide good peak to average power (PAPR) or cubic metric (CM) performance). Each reference signal resource set 410 may be associated with one or more antenna ports (e.g., to support flexible rank transmissions). In some cases, first precoded SRS 420-a may be associated with a first set of antenna ports, and second precoded SRS 420-b may be associated with the same set of antenna ports or with a different set of antenna ports.

In some examples, the LIE 115 may transmit SRS over multiple reference signal resource sets 410. For example, in addition to reference signal resource set 410-a, the UE 115 may transmit multiple sub-band-specific precoded SRSs 420 in reference signal resource set 410-b. As an example, the UE 115 may transmit a third precoded SRS 420-c in symbol period 415-c and fourth precoded SRS 420-d in symbol period 415-d. Although illustrated as being transmitted over the same sub-bands 405, it is to be understood that the precoded SRSs 420-c and 420-d of reference signal resource set 410-b may be transmitted over different sub-bands 405 and/or over a different number of sub-bands 405 (e.g., such that reference signal resource set 410-a includes two sub-bands 405 and reference signal resource set 410-b may include three sub-bands 405). Additionally, in some cases the bandwidth of the sub-bands 405 in reference signal resource set 410-a may be different from the bandwidth of the sub-bands 405 in reference signal resource set 410-b.

A base station 105 (e.g., or some other network device) may perform wideband channel estimation for each sub-band 405 in each reference signal resource set 410. Based at least in part on the channel estimates, the base station 105 may compute an average spectral efficiency for each reference signal resource set 410. Based at least in part on this processing, base station 105 may transmit a report to the UE 115 indicating one or more communication parameters for future uplink transmissions from the UE 115 to the base station 105. In some cases, the report may be transmitted via downlink control signaling associated with an uplink grant. For example, the report may include an SRI (e.g., to indicate a preferred reference signal resource set 410). Additionally or alternatively, the report may include number of layers, precoder information, or MCS. Based on the report, the UE 115 may use the indicated number of layers, MCS, precoder, or any combination thereof for uplink transmissions over the sub-bands 405. As an example, the SRI may indicate that reference signal resource set 410-b has a higher average spectral efficiency than reference signal resource set 410-a (e.g., using the SR). Accordingly, the UE 115 may precode transmissions over sub-band 405-a using the same precoder as precoded SRS 420-c and may precode transmissions over sub-band 405-b using the same precoder as precoded SRS 420-d.

Figure 5:
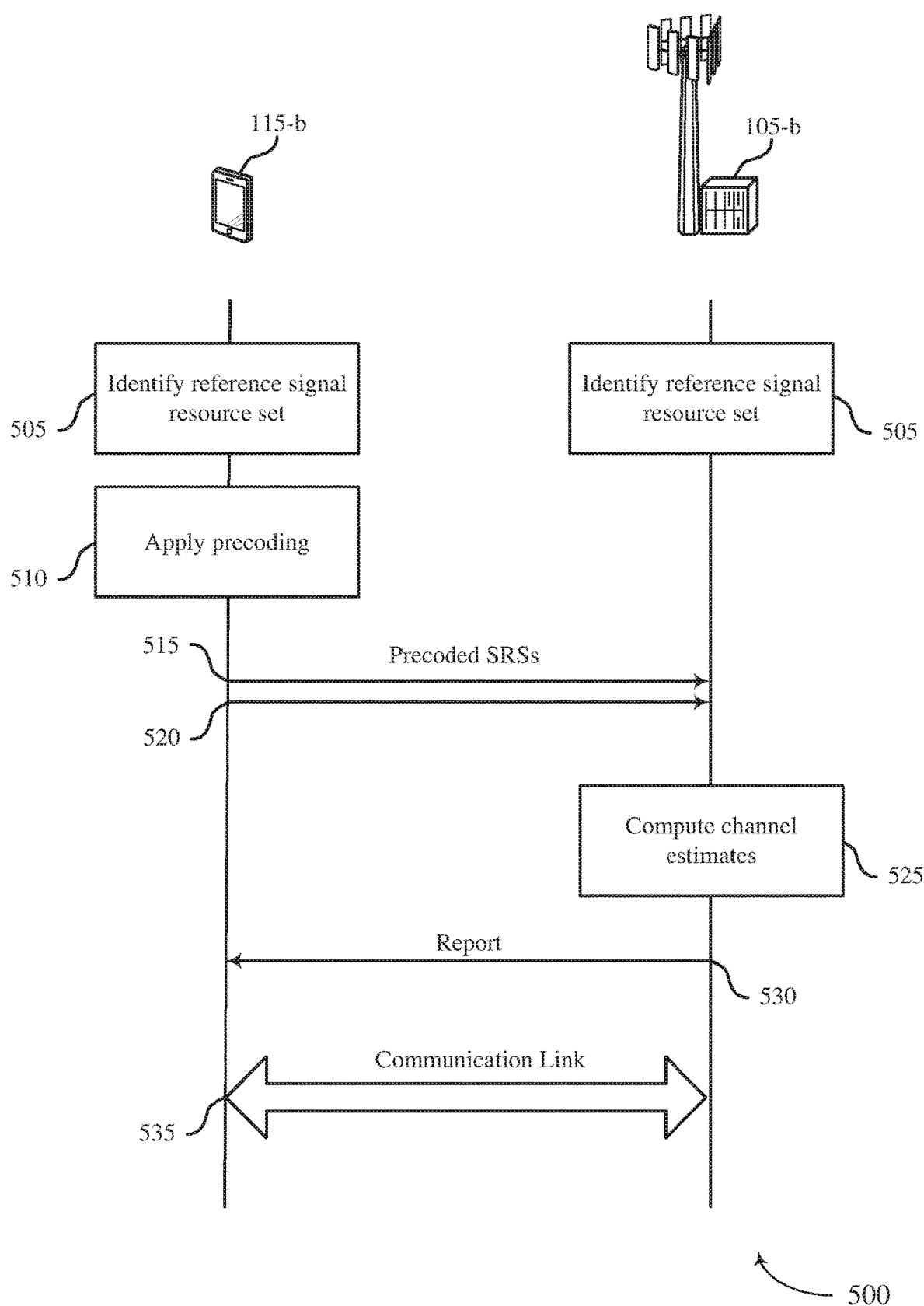
FIG. 5 illustrates an example of a process flow that supports frequency selective uplink precoding for new radio in accordance with aspects of the present disclosure.

FIG. 5 illustrates an example of a process flow 500 that supports frequency selective uplink preceding for new radio in accordance with various aspects of the present disclosure. In some examples, process flow 500 may implement aspects of wireless communications system 100. As illustrated, process flow 500 includes a UE 115-b and base station 105-b, each of which may be an example of the corresponding devices described above.

At 505, UE 115-*b* and base station 105-*b* may each identify one or more reference signal resource sets, in some cases, base station 105-*b* (or some other network entity) may schedule the reference signal resource sets and configure UE 115-*b* to communicate using the indicated resource sets (e.g., using RRC signaling, DCI signaling, etc.). For example, the reference signal resource sets may be identified based at least in part on an indication of a configuration that identifies a number of RBs associated with the reference signal resource set(s).

At 510, UE 115-*b* may apply one or more sub-band-specific precoding matrices to a given reference signal (e.g., a SRS) as described with reference to FIG. 3. For example, UE 115-*b* may apply a first precoding matrix associated with a first sub-band of the reference signal resource set to the reference signal to generate a first precoded SRS and may apply a second precoding matrix associated with a second sub-band of the reference signal resource set to the reference signal to generate a second precoded SRS. In some cases, these operations may be repeated for a second reference signal resource set (e.g., to generate a third precoded SRS and fourth precoded SRS).

At 515, UE 115-*b* may transmit the first precoded SRS over the associated sub-band and may transmit the second precoded SRS over the associated sub-band at 520. Though two precoded SRS transmissions are illustrated, it is to be understood that any suitable number of precoded SRSs may be employed. In some cases, each precoded SRS may be transmitted over a respective symbol period of a given reference signal resource set. As described with reference to FIG. 4, the number of sub-band-specific SRS transmissions (e.g., as well as the bandwidth of each sub-band) may vary between reference signal resource sets.

At 525, base station 105-*b* may compute channel estimates for each sub-band-specific SRS transmission. In some cases, the channel estimates for a given reference signal resource set may be aggregated into a metric (e.g., an average spectral efficiency). Based on the metric, the base station 105-*b* may determine a preferred reference signal resource set.

At 530, base station 105-*b* may transmit a report including at least one communication parameter to UE 115-*b*. For example, the report may include at least one of a number of layers, SRI, precoder information, or MCS. The SRI may be used to indicate a preferred reference signal resource set.

At 535, UE 115-*b* and base station 105-*b* may communicate based at least in part on the communication parameters included, in the report. For example, UE 115-*b* may transmit an uplink signal over a given sub-band and may use the sub-band-specific precoder associated with the given sub-band in the reference signal resource set indicated by the report. Additionally or alternatively, UE 115-*b* may transmit the uplink signal using an MCS and transmit rank indicated by the report.

Figure 6:
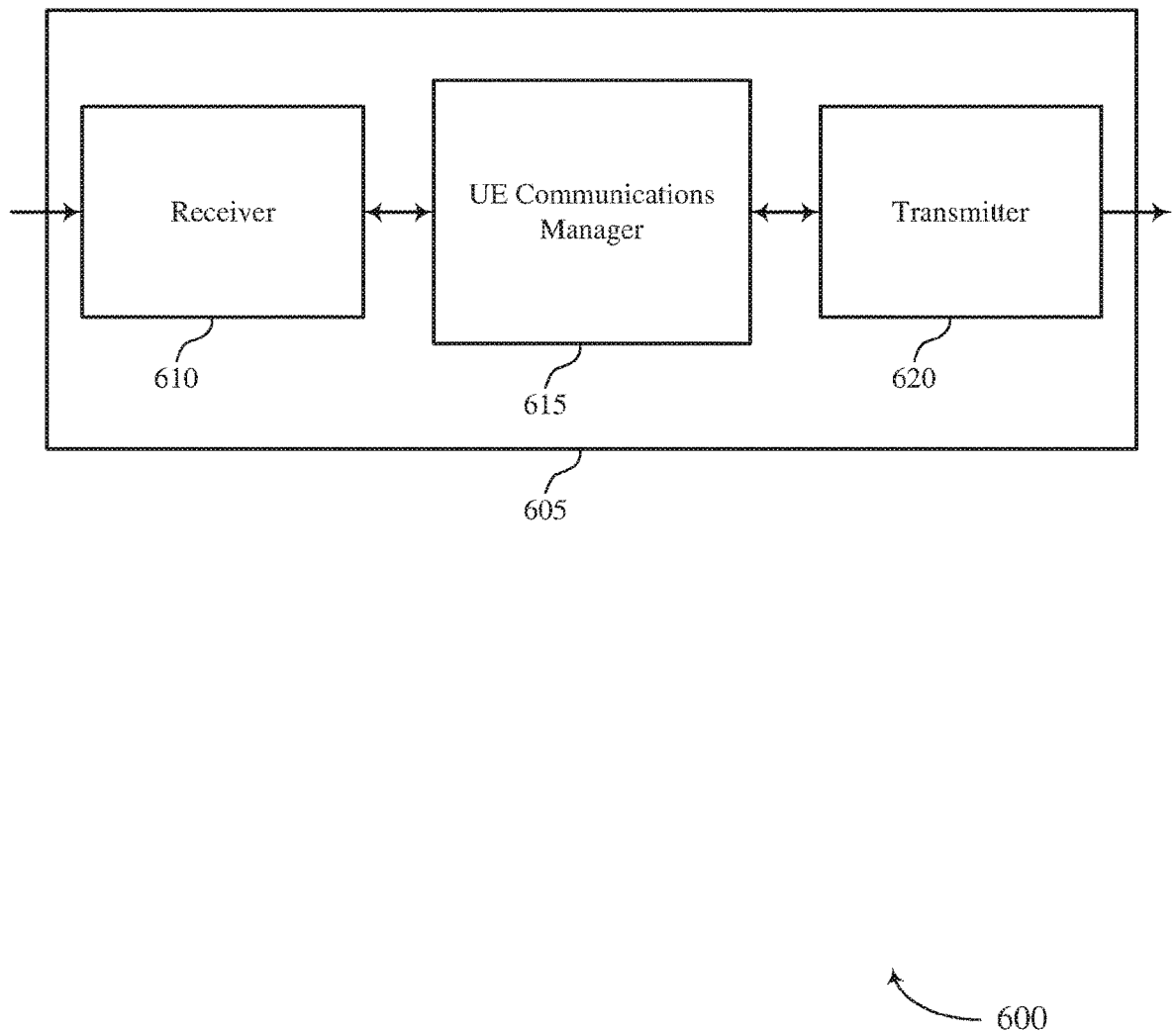
FIGS. 6 through 8 show block diagrams of a device that supports frequency selective uplink precoding for new radio in accordance with aspects of the present disclosure.

FIG. 6 shows a block diagram 600 of a wireless device 605 that supports frequency selective uplink precoding for new radio in accordance with aspects of the present disclosure. Wireless device 605 may be an example of aspects of a UE 115 as described herein. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to frequency selective uplink pre-coding for new radio, etc.). Information may be passed on to other components of the device. The receiver 610 may be an example of aspects of the transceiver 935 described with reference to FIG. 9. The receiver 610 may utilize a set of antennas.

UE communications manager 615 may be an example of aspects of the UE communications manager 915 described with reference to FIG. 9. UE communications manager 615 and/or at least some of its various sub-components may be implemented in hardware, software executed by a processor, firmware, or any combination thereof. If implemented in software executed by a processor, the functions of the UE communications manager 615 and/or at least sonic of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 615 and/or at least some of its various sub-components may be physically located at various positions, including being distributed such that portions of functions are implemented at different physical locations by one or more physical devices. In some examples, LIE communications manager 615 and/or at least some of its various sub-components may be a separate and distinct component in accordance with various aspects of the present disclosure. In other examples, UE communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 615 may receive, from a base station, a configuration of one or more reference signal resource sets comprising one or more reference signal resources. UE communications manager 615 may identify, based at least in part on the configuration, a reference signal resource of the one or more reference signal resources, wherein the reference signal resource comprises a plurality of sub-bands. UE communications manager 615 may apply a first precoding matrix to a reference signal to obtain a first precoded reference signal. UE communications manager 615 may apply a second precoding matrix to the reference signal to obtain a second precoded reference signal. UE communications manager 615 may transmit the first precoded reference signal during a first symbol period of a first sub-band and transmitting the second precoded reference signal during a second symbol period of a second sub-band.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
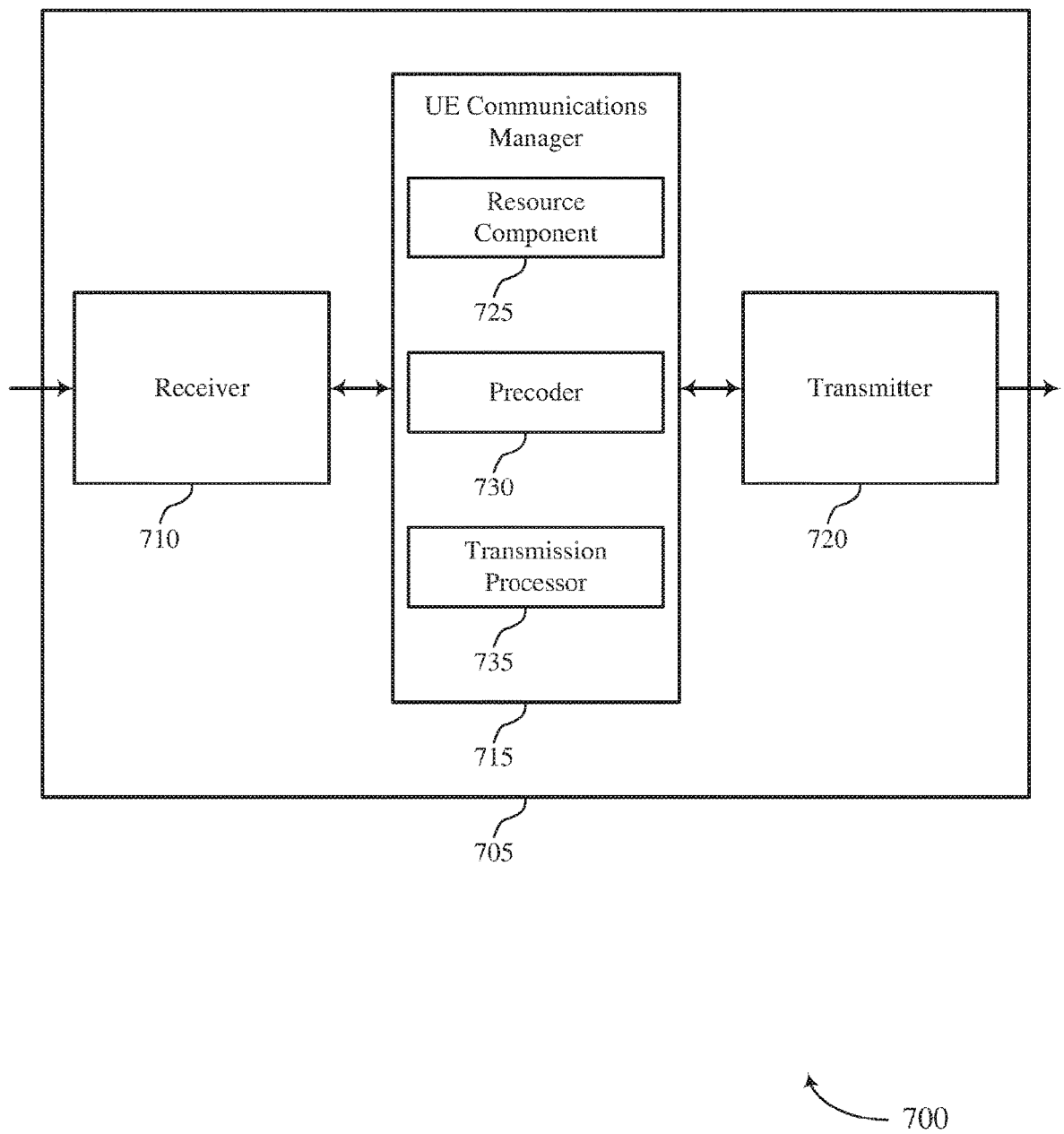

FIG. 7 shows a block diagram 700 of a wireless device 705 that supports frequency selective uplink precoding for new radio in accordance with aspects of the present disclosure. Wireless device 705 may be an example of aspects of a wireless device 605 or a UE 115 as described with reference to FIGS. 1, 2, 3, and 6. Wireless device 705 may include receiver 710, UE communications manager 715, and transmitter 720. Wireless device 705 may also include a processor. Each of these components may be in communication with one another (e.g., via one or more buses). UE communications manager 715 may be an example of aspects of the UE communications manager 915 described with reference to FIG. 9. UE communications manager 715 may also include resource component 725, precoder 730, and transmission processor 735.

Receiver 710 may receive information such as packets, user data, or control information associated with various information channels (e.g., control channels, data channels, and information related to frequency selective uplink precoding for new radio, etc.). Information may be passed on to other components of the device. The receiver 710 may be an example of aspects of the transceiver 935 described with reference to FIG. 9. The receiver 710 may utilize a single antenna or a set of antennas.

Resource component 725 may receive, from a base station, a configuration of one or more reference signal resource sets comprising one or more reference signal resources. Resource component 725 may identify, based at least in part on the configuration, a reference signal resource of the one or more reference signal resources, wherein the reference signal resource comprises a plurality of sub-bands. In some cases, the first sub-band of the set of sub-bands and the first sub-band of the second set of sub-bands have a same bandwidth. Alternatively, the first sub-band of the set of sub-bands and the first sub-band of the second set of sub-bands may have a different bandwidth. In various examples, the set of sub-bands and the second set of sub-bands have a same number of sub-bands or a different number of sub-bands. In some cases, the set of sub-bands and the second set of sub-bands include a same set of sub-bands or a different set of sub-bands. In some cases, the first symbol period occurs prior to the second symbol period.

Precoder 730 may apply a first precoding matrix to a reference signal to obtain a first precoded reference signal, the first precoding matrix associated with a first sub-band of the set of sub-bands. In some cases, precoder 730 may apply a second precoding matrix to the reference signal to obtain a second precoded reference signal, the second precoding matrix associated with a second sub-band of the set of sub-bands. In some cases, applying the first precoding matrix and the second precoding matrix includes applying the first precoding matrix to the reference signal using a first set of antenna ports. In aspects, precoder 730 may apply the second precoding matrix to the reference signal using the first set of antenna ports or a second set of antenna ports. Additionally, in some cases precoder 730 may apply a third precoding matrix to a second reference signal to obtain a third precoded reference signal, the third precoding matrix associated with a first sub-band of the second set of sub-bands. In some cases, precoder 730 may apply a fourth precoding matrix to the second reference signal to obtain a fourth precoded reference signal, the fourth precoding matrix associated with a second sub-band of the second set of sub-bands. In some cases, a precoding granularity of the first precoding matrix is greater than or equal to a number of RBs in the first sub-band and the precoding granularity of the second precoding matrix is greater than or equal to a number of RBs in the second sub-band. That is, for each sub-band, precoder 730 may use a single precoder for all the tones (e.g., RBs) in the sub-band.

Transmission processor 735 may transmit the first precoded reference signal during a first symbol period of the first sub-band and transmit the second precoded reference signal during a second symbol period of the second sub-band. Additionally, transmission processor 735 may transmit the third precoded reference signal during a first symbol period of the first sub-band of the second set of sub-bands and transmit the fourth precoded reference signal during a second symbol period of the second sub-band of the second set of sub-bands. In some cases, transmission processor 735 may receive, from a base station, a second configuration based on the first, second, third, or fourth precoded reference signals, the report including at least one of a SRI, a number of layers, precoder information, or a MCS. Transmission processor 735 may select the reference signal resource set based on the SRI and communicate with the base station over at least one of the first sub-band of the first set of sub-bands using the first precoding matrix and the second sub-band of the first set of sub-bands using the second precoding matrix.

In some cases, transmission processor 735 may communicate with the base station over at least one of the first sub-band of the first set of sub-bands using the first precoding matrix, the second sub-band of the first set of sub-bands using the second precoding matrix, the first sub-band of the second set of sub-bands using the third precoding matrix, and the second sub-band of the second set of sub-bands using the fourth precoding matrix based on the report. In some cases, the reference signal is an SRS and the second configuration is received via downlink control signaling associated with an uplink grant. In some cases, the first and second precoded reference signals are transmitted during a first TTI and the third and fourth precoded reference signals are transmitted during the first TTI or during a second TTI. In some cases, a first bandwidth of the first sub-band is the same as a second bandwidth of the second sub-band.

Transmitter 720 may transmit signals generated by other components (e.g., transmission processor 735) of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
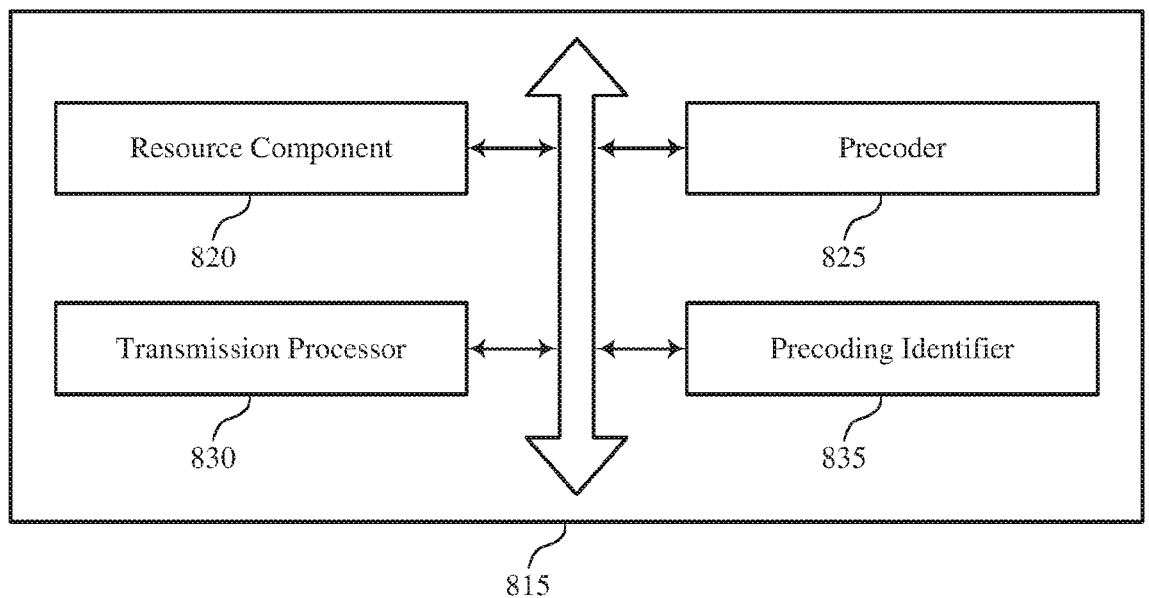

FIG. 8 shows a block diagram 800 of a UE communications manager 815 that supports frequency selective uplink precoding for new radio in accordance with aspects of the present disclosure. The LIE communications manager 815 may be an example of aspects of a UE communications manager 615, a UE communications manager 715, or a UE communications manager 915 described with reference to FIGS. 6, 7, and 9. The UE communications manager 815 may include resource component 820, precoder 825, transmission processor 830, and precoding identifier 835. Each of these modules may communicate, directly or indirectly, with one another (e.g., via one or more buses).

Resource component 820 may receive, from a base station, a configuration of one or more reference signal resource sets comprising one or more reference signal resources. Resource component 820 may identify, based at least in part on the configuration, a reference signal resource of the one or more reference signal resources, wherein the reference signal resource comprises a plurality of sub-bands. In some cases, the first sub-band of the set of sub-bands and the first sub-band of the second set of sub-bands have a same bandwidth. Alternatively, the first sub-band of the set of sub-bands and the first sub-band of the second set of sub-bands may have a different bandwidth. In various examples, the set of sub-bands and the second set of sub-bands have a same number of sub-bands or a different number of sub-bands. In some cases, the set of sub-bands and the second set of sub-bands include a same set of sub-bands or a different set of sub-bands. In some cases, the first symbol period occurs prior to the second symbol period.

Precoder 825 may apply a first precoding matrix to a reference signal to obtain a first precoded reference signal, the first precoding matrix associated with a first sub-band of the set of sub-bands. In some cases, precoder 825 may apply a second precoding matrix to the reference signal to obtain a second precoded reference signal, the second precoding matrix associated with a second sub-band of the set of sub-bands. In some cases, applying the first precoding matrix and the second precoding matrix includes applying the first precoding matrix to the reference signal using a first set of antenna ports. In aspects, precoder 825 may apply the second precoding matrix to the reference signal using the first set of antenna ports or a second set of antenna ports. Additionally, in some cases precoder 825 may apply a third precoding matrix to a second reference signal to obtain a third precoded reference signal, the third precoding matrix associated with a first sub-band of the second set of sub-bands. In some cases, precoder 825 may apply a fourth precoding matrix to the second reference signal to obtain a fourth precoded reference signal, the fourth precoding matrix associated with a second sub-band of the second set of sub-bands. In some cases, a preceding granularity of the first preceding matrix is greater than or equal to a number of RBs in the first sub-band and the precoding granularity of the second precoding matrix is greater than or equal to a number of RBs in the second sub-band. That is, for each sub-band, precoder 825 may use a single precoder for all the tones (e.g., RBs) in the sub-band.

Transmission processor 830 may transmit the first precoded reference signal during a first symbol period of the first sub-band and transmit the second precoded reference signal during a second symbol period of the second sub-band. Additionally, transmission processor 830 may transmit the third precoded reference signal during a first symbol period of the first sub-band of the second set of sub-bands and transmit the fourth preceded reference signal during a second symbol period of the second sub-band of the second set of sub-bands. In some cases, transmission processor 830 may receive, from a base station, a second configuration based on the first, second, third, or fourth preceded reference signals, the second configuration including at least one of a SRI, a number of layers, precoder information, or a MCS. Transmission processor 830 may select the reference signal resource set based on the SRI and communicate with the base station over at least one of the first sub-band of the first set of sub-bands using the first precoding matrix and the second sub-band of the first set of sub-bands using the second precoding matrix.

In some cases, transmission processor 830 may communicate with the base station over at least one of the first sub-band of the first set of sub-bands using the first precoding matrix, the second sub-band of the first set of sub-bands using the second precoding matrix, the first sub-band of the second set of sub-bands using the third precoding matrix, and the second sub-band of the second set of sub-bands using the fourth precoding matrix based on the report. In some cases, the reference signal is an SRS and the report is received via downlink control signaling associated with an uplink grant. In some cases, the first and second precoded reference signals are transmitted during a first TTI and the third and fourth precoded reference signals are transmitted during the first TTI or during a second TTI in some cases, a first bandwidth of the first sub-band is the same as a second bandwidth of the second sub-band.

Preceding identifier 835 may determine at least one of the first preceding matrix and the second preceding matrix based on a reciprocity between a downlink signal received at the UE and an uplink signal sent from the UE.

Figure 9:
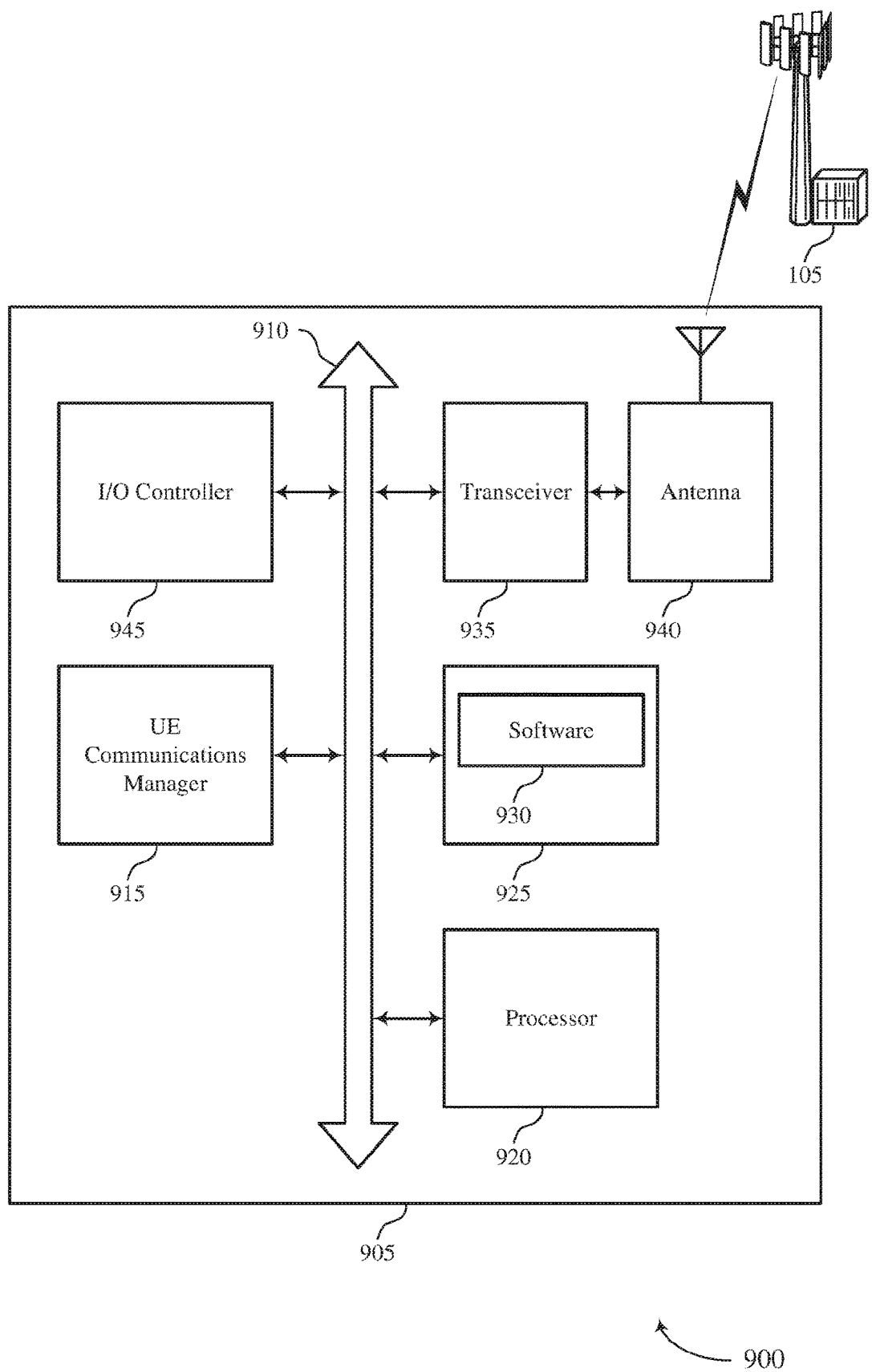
FIG. 9 illustrates a block diagram of a system including a UE that supports frequency selective uplink precoding for new radio in accordance with aspects of the present disclosure.

FIG. 9 shows a diagram of a system 900 including a device 905 that supports frequency selective uplink precoding for new radio in accordance with aspects of the present disclosure. Device 905 may be an example of or include the components of wireless device 605, wireless device 705, or a UE 115 as described above, e.g., with reference to FIGS. 6 and 7. Device 905 may include components for bi-directional voice and data communications including components for transmitting and receiving communications, including UE communications manager 915, processor 920, memory 925, software 930, transceiver 935, antenna 940, and I/O controller 945. These components may be in electronic communication via one or more buses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting frequency selective uplink precoding for new radio).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support frequency selective uplink precoding for new radio. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas. In some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
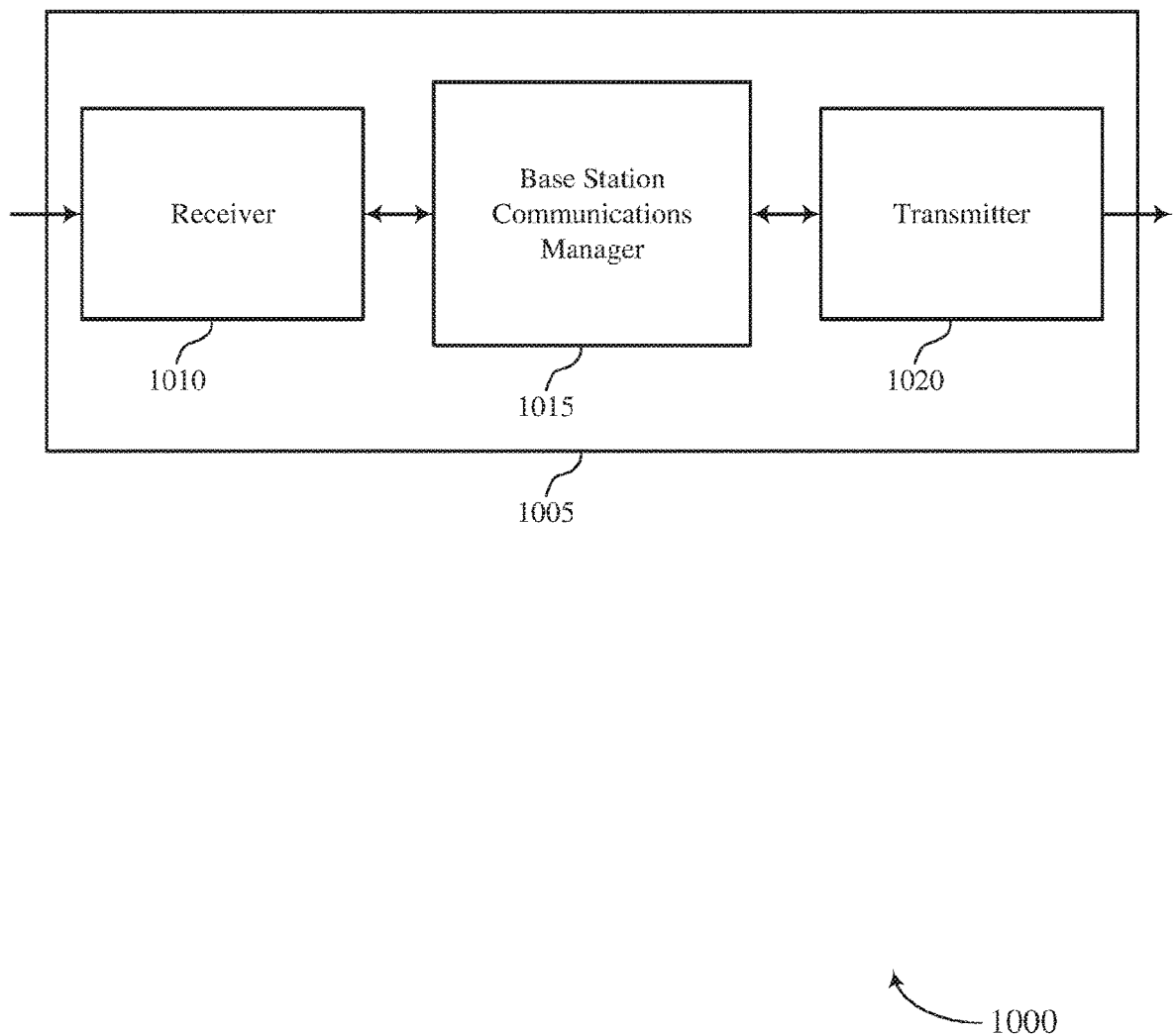
FIGS. 10 through 12 show block diagrams of a device that supports frequency selective uplink precoding for new radio in accordance with aspects of the present disclosure.

FIG. 10 shows a block diagram 1000 of a wireless device 1005 that supports frequency selective uplink precoding for new radio in accordance with aspects of the present disclosure. Wireless device 1005 may be an example of aspects of a base station 105 as described herein. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to frequency selective uplink precoding for new radio, etc.). Information may be passed on to other components of the device. The receiver 1010 may be an example of aspects of the transceiver 1335 described with reference to FIG. 13. The receiver 1010 may utilize a single antenna or a set of antennas.

Base station communications manager 1015 may be an example of aspects of the base station communications manager 1315 described with reference to FIG. 13. Base station communications manager 1015 and/or at least some of its various sub-components may be implemented in hardware, software executed by a processor, firmware, or any combination thereof. If implemented in software executed by a processor, the functions of the base station communications manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 1015 and/or at least some of its various sub-components may be physically located at various positions, including being distributed such that portions of functions are implemented at different physical locations by one or more physical devices. In some examples, base station communications manager 1015 and/or at least some of its various sub-components may be a separate and distinct component in accordance with various aspects of the present disclosure. In other examples, base station communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1015 may identify a reference signal resource of one or more reference signal resources, the reference signal resource comprising a plurality of sub-bands, transmit, to a UE, a first configuration of one or more reference signal resource sets comprising the one or more reference signals, the first configuration identifying the reference signal resource, receive a first reference signal during a first symbol period of a first sub-band of the plurality of sub-bands and receiving a second reference signal during a second symbol period of a second sub-band of the plurality of sub-bands, compute respective channel estimates of the first sub-band and the second sub-band, and transmit, to the UE, a second configuration comprising at least one of a SRI, a number of layers, precoding information, or a modulation and coding scheme (MCS) based at least in part on the respective channel estimates.

Transmitter 1020 may transmit signals generated by other components of the device. In some examples, the transmitter 1020 may be collocated with a receiver 1010 in a transceiver module. For example, the transmitter 1020 may be art example of aspects of the transceiver 1335 described with reference to FIG. 13. The transmitter 1020 may utilize a single antenna or a set of antennas.

Figure 11:
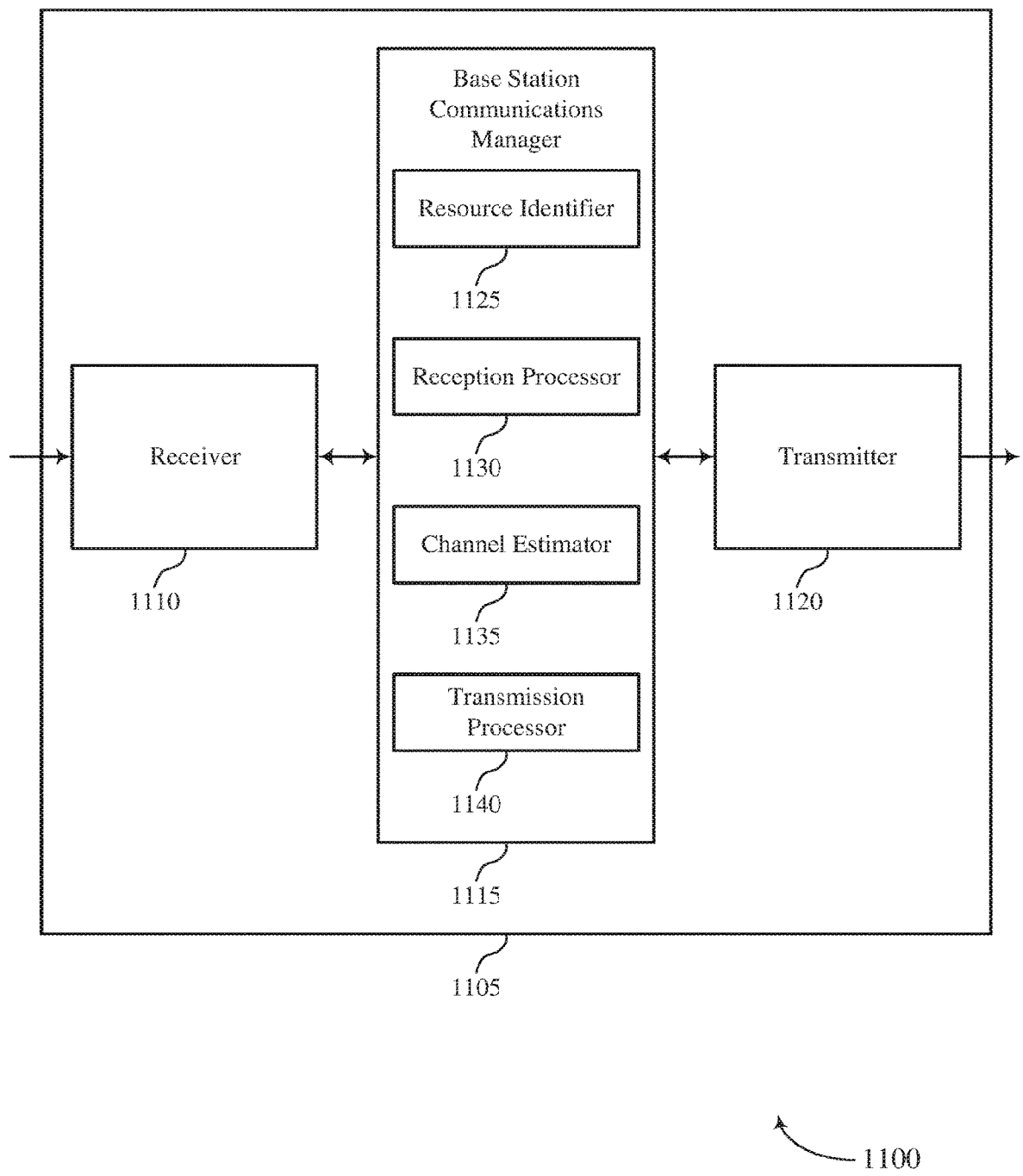

FIG. 11 shows a block diagram 1100 of a wireless device 1105 that supports frequency selective uplink precoding for new radio in accordance with aspects of the present disclosure. Wireless device 1105 may be an example of aspects of a wireless device 1005 or a base station 105 as described with reference to FIGS. 1, 2, 3, and 10. Wireless device 1105 may include receiver 1110, base station communications manager 1115, and transmitter 1120. Wireless device 1105 may also include a processor in some examples. Each of these components may be in communication with one another (e.g., via one or more buses). Base station communications manager 1115 may be an example of aspects of the base station communications manager 1315 described with reference to FIG. 13. Base station communications manager 1115 may also include resource identifier 1125, reception processor 1130, channel estimator 1135, and transmission processor 1140.

Receiver 1110 may receive information such as packets, user data, or control information associated with various information channels (e.g., control channels, data channels, and information related to frequency selective uplink precoding for new radio, etc.). Information may be passed on to other components of the device. The receiver 1110 may be an example of aspects of the transceiver 1335 described with reference to FIG. 13. The receiver 1110 may utilize a single antenna or a set of antennas.

Resource identifier 1125 may identify a reference signal resource of one or more reference signal resources, the reference signal resource comprising a plurality of sub-bands. Resource identifier 1125 may transmit, to a UE, a first configuration of one or more reference signal resource sets comprising the one or more reference signals, the first configuration identifying the reference signal resource. In some cases, the first sub-band of the set of sub-bands and the first sub-band of the second set of sub-bands have a same bandwidth or a different bandwidth. In some cases, the set of sub-bands and the second set of sub-bands have a same number of sub-bands or a different number of sub-bands. In some cases, the set of sub-bands and the second set of sub-bands include a same set of sub-bands or a different set of sub-bands.

Reception processor 1130 may receive a first reference signal during a first symbol period of a first sub-band of the set of sub-bands and receive a second reference signal during a second symbol period of a second sub-band of the set of sub-bands. In some cases, reception processor 1130 may receive a third reference signal during a first symbol period of a first sub-band of the second set of sub-bands and receive a fourth reference signal during a second symbol period of a second sub-band of the second set of sub-bands. In some cases, reception processor 1130 may additionally receive, from a second UE, a third reference signal during the first symbol period of the first sub-band of the set of sub-bands and receive, from the second UE, a fourth reference signal during the second symbol period of the second sub-band of the set of sub-bands (e.g., based on any of the multiplexing techniques described above). In some cases, the first and second reference signals are received in a first TTI and the third and fourth reference signals are received in the first TTI or a second TTI. In some cases, each of the first reference signal and the second reference signal includes a SRS. In some cases, the first symbol period occurs prior to the second symbol period.

Channel estimator 1135 may compute respective channel estimates of the first sub-band and the second sub-band based on a first precoding matrix applied to the first reference signal and a second precoding matrix applied to the second reference signal. In some cases, channel estimator 1135 may compute second respective channel estimates of the first and second sub-band of the second set of sub-bands based on a third precoding matrix applied to the third reference signal and a fourth precoding matrix applied to the fourth reference signal. In some cases, channel estimator 1135 may compute second respective channel estimates of the first sub-band and the second sub-band based on a third precoding matrix applied to the third reference signal and a fourth precoding matrix applied to the fourth reference signal. In aspects, channel estimator 1135 may determine a preferred reference signal resource set based on a respective average spectral efficiency. Channel estimator 1135 may perform independent channel estimation for the first sub-band during the first symbol period based on the first reference signal and the second sub-band during the second symbol period based on the second reference signal.

Transmission processor 1140 may determine the number of layers and MCS of the reference signal resource set. For example, the transmission processor 1140 may determine at least one of a number of layers, a SRI, precoder information, or a MCS based on the average spectral efficiency and transmit a report including at least one of the number of layers, the SRI, the precoder information, or the MCS based on the respective channel estimates. In some cases, transmission processor 1140 may transmit the report based on the determining, where the report further includes a SRI indicating the preferred reference signal resource set. In some cases, the report is transmitted via downlink control signaling associated with an uplink grant. In aspects, transmission processor 1140 may transmit a second report including at least one of a second number of layers, a second MCS, second precoder information, or a second SRI to the second UE based on the second respective channel estimates.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
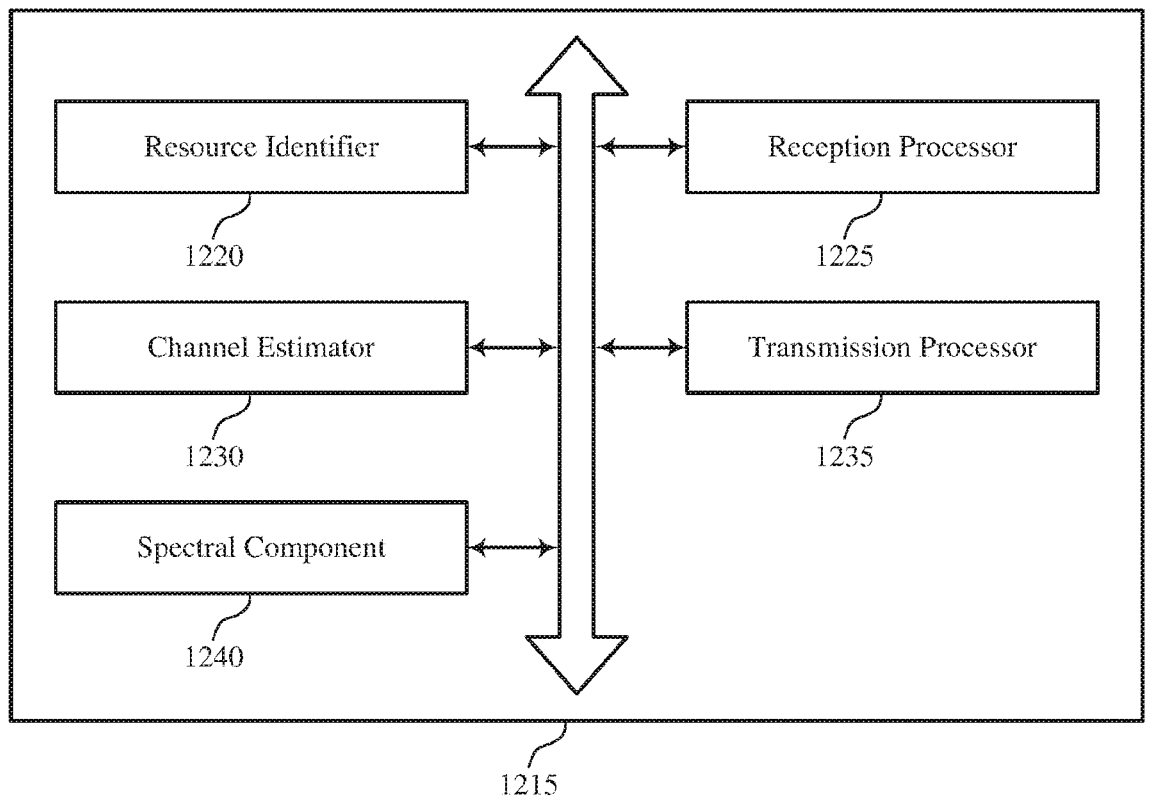

FIG. 12 shows a block diagram 1200 of a base station communications manager 1215 that supports frequency selective uplink precoding for new radio in accordance with aspects of the present disclosure. The base station communications manager 1215 may be an example of aspects of a base station communications manager 1315 described with reference to FIGS. 10, 11, and 13. The base station communications manager 1215 may include resource identifier 1220, reception processor 1225, channel estimator 1230, transmission processor 1235, and spectral component 1240. Each of these modules may communicate, directly or indirectly, with one another (e.g., via one or more buses).

Resource identifier 1220 may identify a reference signal resource set including a set of sub-bands and identify a second reference signal resource set including a second set of sub-bands. Resource identifier 1220 may transmit, to a UE, an indication of a configuration that identifies a number of RBs associated with the reference signal resource set. In some cases, the first sub-band of the set of sub-bands and the first sub-band of the second set of sub-bands have a same bandwidth or a different bandwidth. In some cases, the set of sub-bands and the second set of sub-bands have a same number of sub-bands or a different number of sub-bands. In some cases, the set of sub-bands and the second set of sub-bands include a same set of sub-bands or a different set of sub-bands.

Reception processor 1225 may receive a first reference signal during a first symbol period of a first sub-band of the set of sub-bands and receive a second reference signal during a second symbol period of a second sub-band of the set of sub-bands. In some cases, reception processor 1225 may receive a third reference signal during a first symbol period of a first sub-band of the second set of sub-bands and receive a fourth reference signal during a second symbol period of a second sub-band of the second set of sub-bands. In some cases, reception processor 1225 may additionally receive, from a second UE, a third reference signal during the first symbol period of the first sub-band of the set of sub-bands and receive, from the second UE, a fourth reference signal during the second symbol period of the second sub-band of the set of sub-bands (e.g., based on any of the multiplexing techniques described above). In some cases, the first and second reference signals are received in a first TTI and the third and fourth reference signals are received in the first TTI or a second TTI. In some cases, each of the first reference signal and the second reference signal includes a SRS. In some cases, the first symbol period occurs prior to the second symbol period.

Channel estimator 1230 may compute respective channel estimates of the first sub-band and the second sub-band based on a first precoding matrix applied to the first reference signal and a second precoding matrix applied to the second reference signal. In some cases, channel estimator 1230 may compute second respective channel estimates of the first and second sub-band of the second set of sub-bands based on a third precoding matrix applied to the third reference signal and a fourth precoding matrix applied to the fourth reference signal. In some cases, channel estimator 1230 may compute second respective channel estimates of the first sub-band and the second sub-band based on a third precoding matrix applied to the third reference signal and a fourth precoding matrix applied to the fourth reference signal. In aspects, channel estimator 1230 may determine a preferred reference signal resource set based on a respective average spectral efficiency. Channel estimator 1230 may perform independent channel estimation for the first sub-band during the first symbol period based on the first reference signal and the second sub-band during the second symbol period based on the second reference signal.

Transmission processor 1235 may determine the number of layers and MCS of the reference signal resource set. For example, the transmission processor 1235 may determine at least one of a number of layers, precoder information, a SRI, or a MCS based on the average spectral efficiency and transmit a report including at least one of the number of layers, the precoder information, the SRI, or the MCS based on the respective channel estimates. In some cases, transmission processor 1235 may transmit the report based on the determining, where the report further includes a SRI indicating the preferred reference signal resource set. In some cases, the report is transmitted via downlink control signaling associated with an uplink grant. In aspects, transmission processor 1235 may transmit a second report including at least one of a second number of layers, second precoder information, a second SRI, or a second MCS to the second UE based on the second respective channel estimates.

Spectral component 1240 may compute an average spectral efficiency of the reference signal resource set based on the respective channel estimates and compute a second average spectral efficiency of the second reference signal resource set based on the second respective channel estimates.

Figure 13:
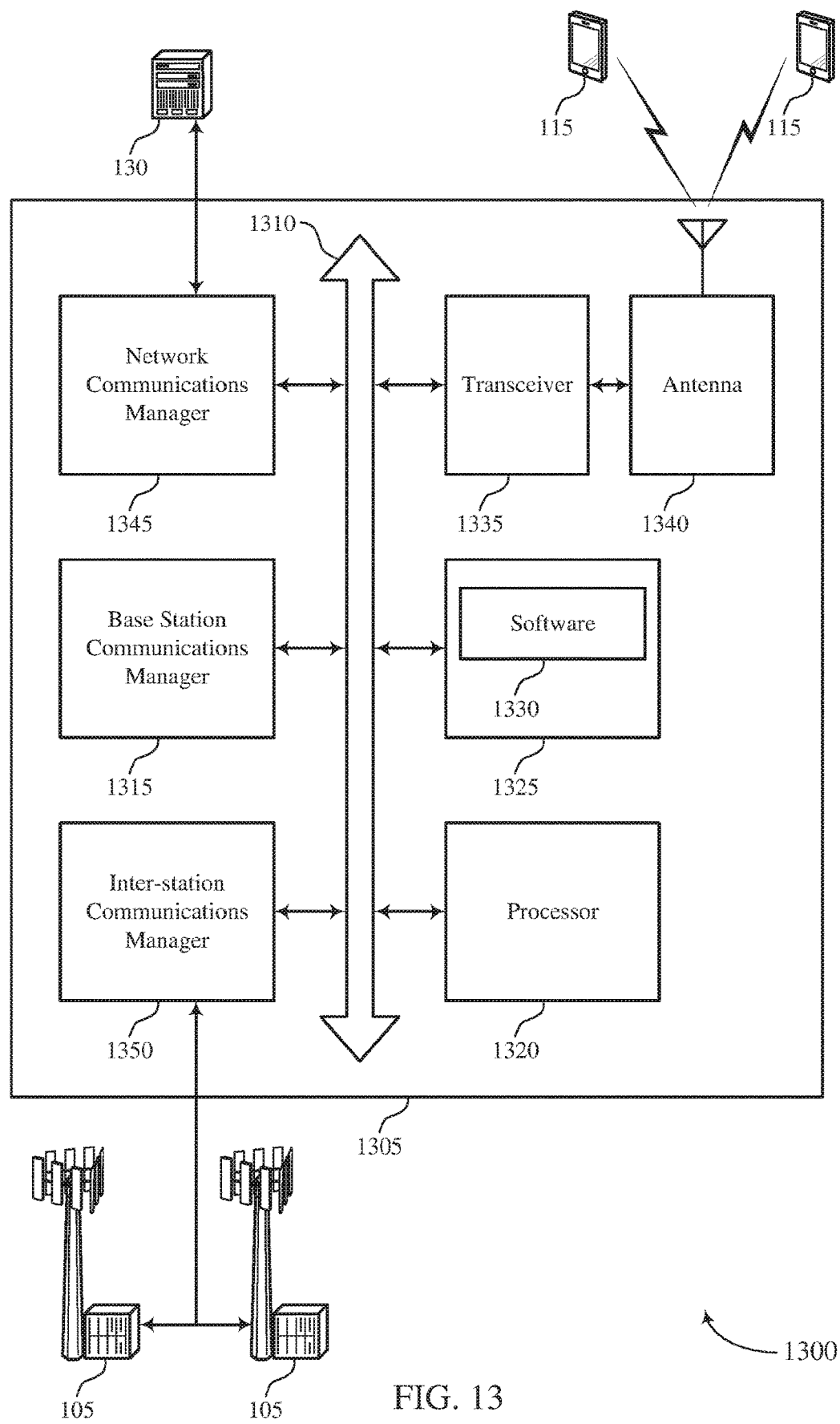
FIG. 13 illustrates a block diagram of a system including a base station that supports frequency selective uplink precoding for new radio in accordance with aspects of the present disclosure.

FIG. 13 shows a diagram of a system 1300 including a device 1305 that supports frequency selective uplink precoding for new radio in accordance with aspects of the present disclosure. Device 1305 may be an example of or include the components of base station 105 as described above, e.g., with reference to FIG. 1. Device 1305 may include components for bi-directional voice and data communications including components for transmitting and receiving communications, including base station communications manager 1315, processor 1320, memory 1325, software 1330, transceiver 1335, antenna 1340, network communications manager 1345, and inter-station communications manager 1350. These components may be in electronic communication via one or more buses (e.g., bus 1310). Device 1305 may communicate wirelessly with one or more UEs 115.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting frequency selective uplink precoding for new radio).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware or software operation such as the interaction with peripheral components or devices.

Software 1330 may include code to implement aspects of the present disclosure, including code to support frequency selective uplink precoding for new radio. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate hi-directionally, via one or more antennas, wired, or wireless links as described above. For example, the transceiver 1335 may represent a wireless transceiver and may communicate hi-directionally with another wireless transceiver. The transceiver 1335 may also include a modem to modulate the packets and provide the modulated packets to the antennas for transmission, and to demodulate packets received from the antennas. In some cases the device may have more than one antenna 1340, which may be capable of concurrently transmitting or receiving multiple wireless transmissions.

Network communications manager 1345 may manage communications with the core network 130 (e.g., via one or more wired backhaul links). For example, the network communications manager 1345 may manage the transfer of data communications for client devices, such as one or more UEs 115.

Inter-station communications manager 1350 may manage communications with other base station 105, and may include a controller or scheduler for controlling communications with UEs 115 in cooperation with other base stations 105. For example, the inter-station communications manager 1350 may coordinate scheduling for transmissions to UEs 115 for various interference mitigation techniques such as beamforming or joint transmission. In some examples, inter-station communications manager 1350 may provide an X2 interface within an Long Term Evolution (LTE)/LTE-A wireless communication network technology to provide communication between base stations 105.

Figure 14:
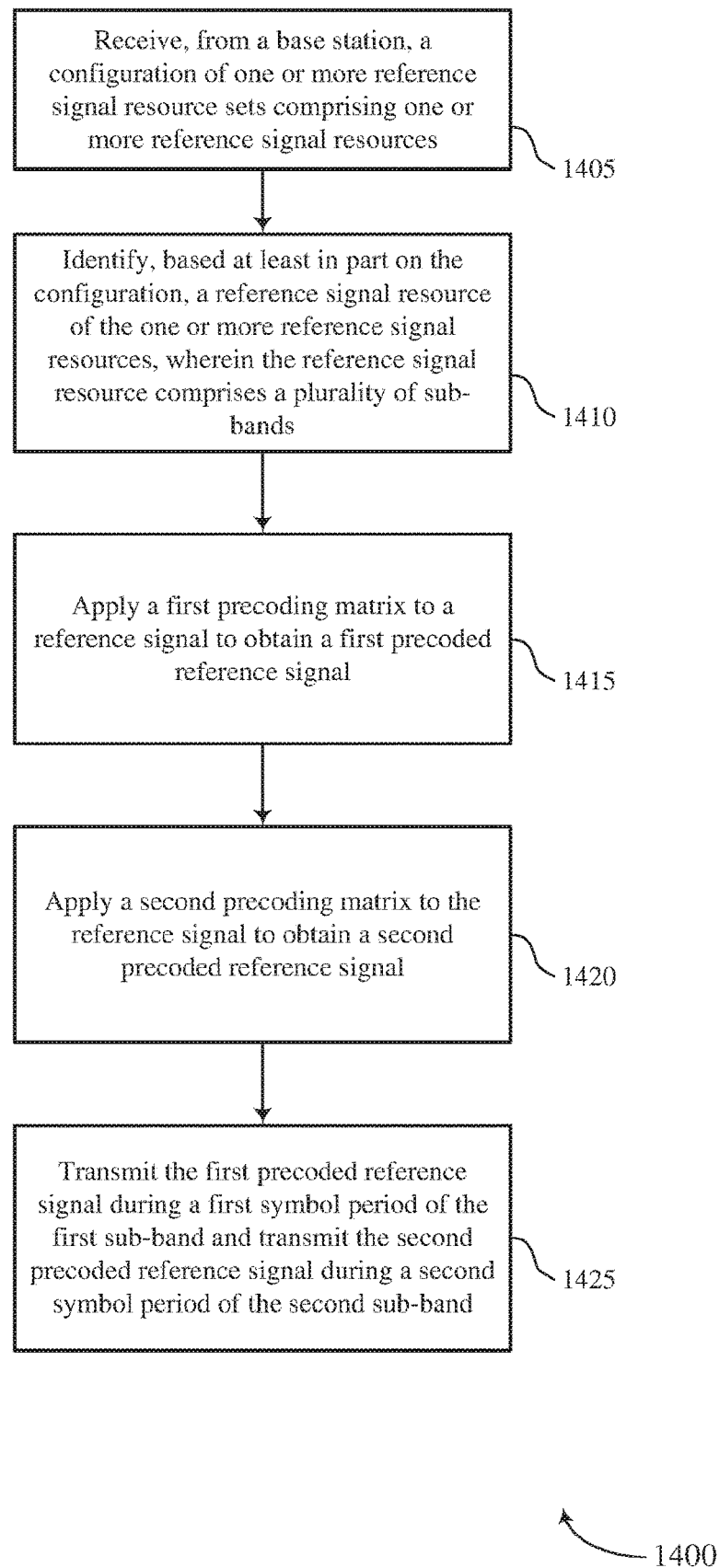
FIGS. 14 through 17 illustrate methods for frequency selective uplink precoding for new radio in accordance with aspects of the present disclosure.

FIG. 14 shows a flowchart illustrating a method 1400 for frequency selective uplink preceding for new radio in accordance with aspects of the present disclosure. The operations of method 1400 may be implemented by a UE 115 or its components as described herein. For example, the operations of method 1400 may be performed by a UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1405, the UE 115 may receive, from a base station, a configuration of one or more reference signal resource sets comprising one or more reference signal resources. The operations of 1405 may be performed according to the methods described herein. In certain examples, aspects of the operations of 1405 may be performed by a resource component as described with reference to FIGS. 6 through 9.

At 1410 the UE 115 may identify, based at least in part on the configuration, a reference signal resource of the one or more reference signal resources, wherein the reference signal resource comprises a plurality of sub-bands. For example, the UE 115 may identify the reference signal resource set based at least in part on the indication of the configuration that identifies a number of RBs. The operations of 1410 may be performed according to the methods described herein. In certain examples, aspects of the operations of 1410 may be performed by a resource component as described with reference to FIGS. 6 through 9.

At 1415 the UE 115 may apply a first precoding matrix to a reference signal to obtain a first precoded reference signal, the first preceding matrix associated with a first sub-band of the plurality of sub-bands. The operations of 1415 may be performed according to the methods described herein. In certain examples, aspects of the operations of 1415 may be performed by a precoder as described with reference to FIGS. 6 through 9.

At 1420 the UE 115 may apply a second preceding matrix to the reference signal to obtain a second preceded reference signal, the second precoding matrix associated with a second sub-band of the plurality of sub-bands. The operations of 1420 may be performed according to the methods described herein. In certain examples, aspects of the operations of 1420 may be performed by a precoder as described with reference to FIGS. 6 through 9.

At 1425 the UE 115 may transmit the first preceded reference signal during a first symbol period of the first sub-band and transmit the second preceded reference signal during a second symbol period of the second sub-band. The operations of 1425 may be performed according to the methods described herein. In certain examples, aspects of the operations of 1425 may be performed by a transmission processor as described with reference to FIGS. 6 through 9.

Figure 15:
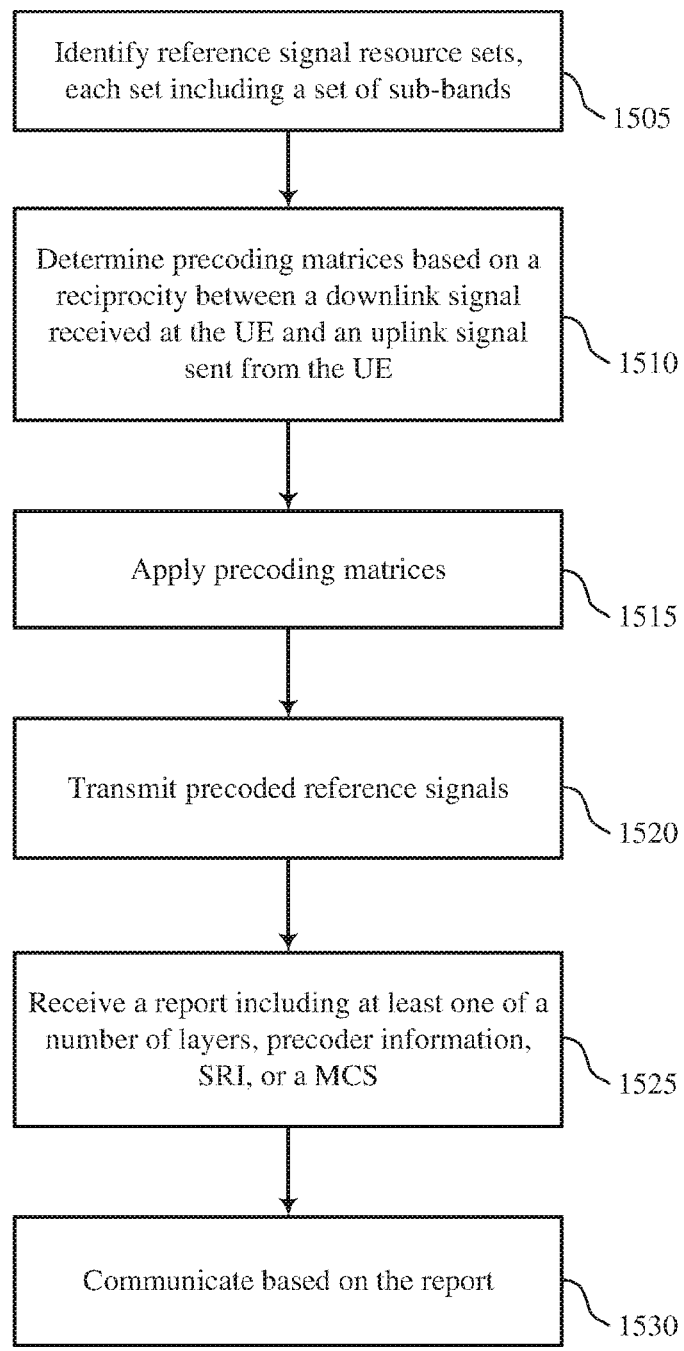

FIG. 15 shows a flowchart illustrating a method 1500 for frequency selective uplink preceding for new radio in accordance with aspects of the present disclosure. The operations of method 1500 may be implemented by a UE 115 or its components as described herein. For example, the operations of method 1500 may be performed by a UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1505 the UE 115 may identify one or more reference signal resource sets, each reference signal resource set comprising a plurality of sub-bands. The operations of 1505 may be performed according to the methods described herein. In certain examples, aspects of the operations of 1505 may be performed by a resource component as described with reference to FIGS. 6 through 9.

At 1510 the UE 115 may determine respective sub-band-specific precoding matrices based at least in part on a reciprocity between a downlink signal received at the UE and an uplink signal sent from the UE. The operations of 1510 may be performed according to the methods described herein. In certain examples, aspects of the operations of 1510 may be performed by a precoding, identifier as described with reference to FIGS. 6 through 9.

At 1515 the UE 115 may apply the precoding matrices to one or more reference signals. For example, each reference signal resource set may be associated with a given reference signal, and the sub-band-specific precoders for each reference signal resource set may be applied to the given reference signal to generate respective sub-band-specific precoded reference signals. The operations of 1515 may be performed according to the methods described herein. In certain examples, aspects of the operations of 1515 may be performed by a precoder as described with reference to FIGS. 6 through 9.

At 1520 the UE 115 may transmit the precoded reference signals during respective symbol periods of the given sub-bands. The operations of 1520 may be performed according to the methods described herein. In certain examples, aspects of the operations of 1520 may be performed by a transmission processor as described with reference to FIGS. 6 through 9.

At 1525 the UE 115 may receive, from a base station, a report based at least in part on the precoded reference signals, the report comprising at least one of a number of layers, SRI, precoder information, or a MCS. The operations of 1525 may be performed according to the methods described herein. In certain examples, aspects of the operations of 1525 may be performed by a transmission processor as described with reference to FIGS. 6 through 9.

At 1530 the UE 115 may communicate with the base station over an indicated sub-band using the associated sub-band-specific precoder based at least in part on the report. The operations of 1530 may be performed according to the methods described herein. In certain examples, aspects of the operations of 1530 may be performed by a transmission processor as described with reference to FIGS. 6 through 9.

Figure 16:
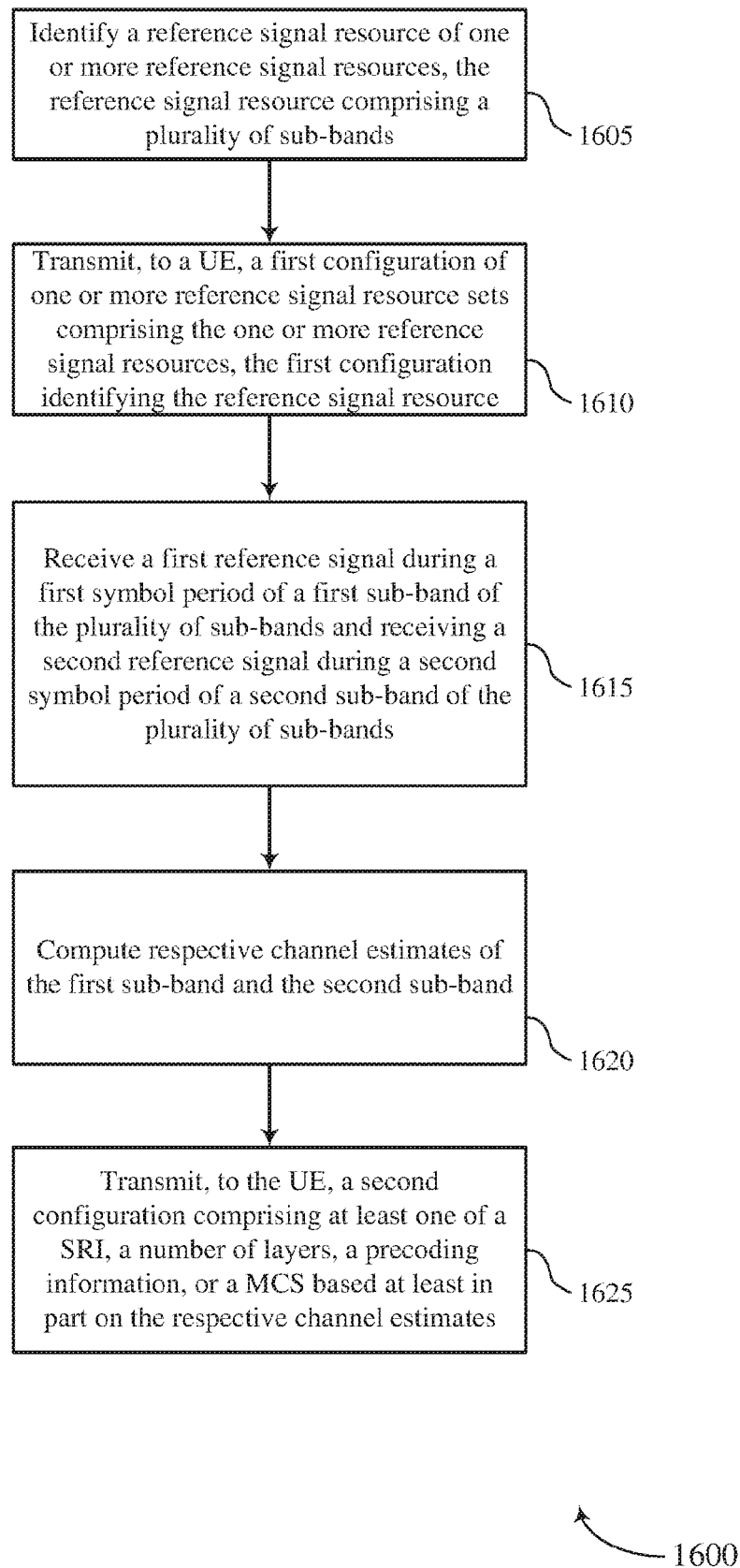

FIG. 16 shows a flowchart illustrating a method 1600 for frequency selective uplink preceding for new radio in accordance with aspects of the present disclosure. The operations of method 1600 may be implemented by a base station 105 or its components as described herein. For example, the operations of method 1600 may be performed by a base station communications manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At 1605 the base station 105 may identify a reference signal resource of one or more reference signal resources, the reference signal resource comprising a plurality of sub-bands. The operations of 1605 may be performed according to the methods described herein. In certain examples, aspects of the operations of 1605 may be performed by a resource identifier as described with reference to FIGS. 10 through 13.

At 1610, the base station 105 may transmit, to a UE, a first configuration of one or more reference signal resource sets comprising the one or more reference signal resources, the first configuration identifying the reference signal resource. The operations of 1610 may be performed according to the methods described herein. In certain examples, aspects of the operations of 1610 may be performed by a resource identifier as described with reference to FIGS. 10 through 13.

At 1615 the base station 105 may receive a first reference signal during a first symbol period of a first sub-band of the plurality of sub-bands and receiving a second reference signal during a second symbol period of a second sub-band of the plurality of sub-bands. The operations of 1615 may be performed according to the methods described herein. In certain examples, aspects of the operations of 1615 may be performed by a reception processor as described with reference to FIGS. 10 through 13.

At 1620 the base station 105 may compute respective channel estimates of the first sub-band and the second sub-band. The operations of 1620 may be performed according to the methods described herein. In certain examples, aspects of the operations of 1620 may be performed by a channel estimator as described with reference to FIGS. 10 through 13.

At 1625 the base station 105 may transmit, to the UE, a second configuration comprising at least one of a SRI, a number of layers, a preceding information, or a MCS based at least in part on the respective channel estimates. The operations of 1625 may be performed according to the methods described herein. In certain examples, aspects of the operations of 1625 may be performed by a transmission processor as described with reference to FIGS. 10 through 13.

Figure 17:
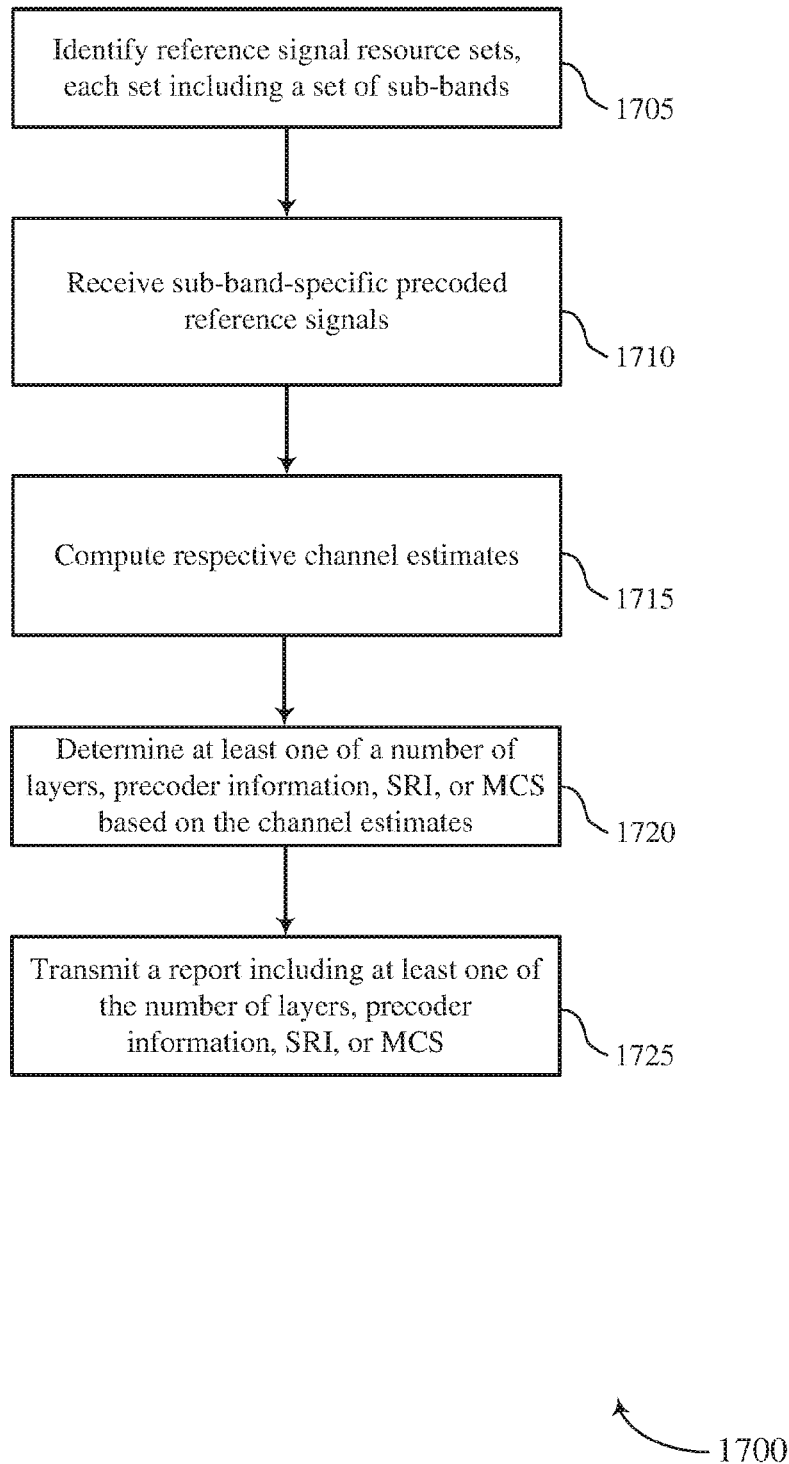

FIG. 17 shows a flowchart illustrating a method 1700 for frequency selective uplink preceding for new radio in accordance with aspects of the present disclosure. The operations of method 1700 may be implemented by a base station 105 or its components as described herein. For example, the operations of method 1700 may be performed by a base station communications manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At 1705 the base station 105 may identify one or more reference signal resource sets, each set comprising a plurality of sub-bands. The operations of 1705 may be performed according to the methods described herein. In certain examples, aspects of the operations of 1705 may be performed by a resource identifier as described with reference to FIGS. 10 through 13.

At 1710 the base station 105 may receive respective sub-band-specific precoded reference signal during respective symbol periods of the respective sub-bands. For example, each reference signal resource set may be associated with a given reference signal, and the respective sub-band specific precoded reference signals may be generated based on applying sub-band-specific precoders to the given reference signal. The operations of 1710 may be performed according to the methods described herein. In certain examples, aspects of the operations of 1710 may be performed by a reception processor as described with reference to FIGS. 10 through 13.

At 1715 the base station 105 may compute respective channel estimates of the sub-bands based at least in part on a respective precoding matrix applied to the each respective precoded reference signal. The operations of 1715 may be performed according to the methods described herein. In certain examples, aspects of the operations of 1715 may be performed by a channel estimator as described with reference to FIGS. 10 through 13.

At 1720 the base station 105 may determine at least one of a number of layers, SRI, and MCS based at least in part on the channel estimates. The operations of 1720 may be performed according to the methods described herein. In certain examples, aspects of the operations of 1720 may be performed by a transmission processor as described with reference to FIGS. 10 through 13.

At 1725 the base station 105 may transmit a report comprising at least one of a number of layers, SRI, precoder information, or a MCS based at least in part on the respective channel estimates. The operations of 1725 may be performed according to the methods described herein. In certain examples, aspects of the operations of 1725 may be performed by a transmission processor as described with reference to FIGS. 10 through 13.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, LTE, LTE-A, NR, and GSM are described in documents from the organization named "3$^{rd}$ Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C), Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
receiving, from a network entity, a configuration of one or more reference signal resource sets comprising one or more reference signal resources, the one or more reference signal resources comprising a reference signal resource comprising a plurality of sub-bands;

applying a first precoding matrix to a reference signal to obtain a first precoded reference signal, the first precoding matrix associated with a first sub-band of the plurality of sub-bands;

applying a second precoding matrix to the reference signal to obtain a second precoded reference signal, the second precoding matrix associated with a second sub-band of the plurality of sub-bands;

transmitting the first precoded reference signal during a first symbol period of the first sub-band and transmitting the second precoded reference signal during a second symbol period of the second sub-band; and receiving, from the network entity, a second configuration comprising at least a sounding resource indicator (SRI) at least in part in response to the first precoded reference signal and the second precoded reference signal, wherein the SRI indicates a reference signal resource set selected based at least in part on the first precoded reference signal and the second precoded reference signal.

2. The method of claim 1, wherein applying the first precoding matrix and the second precoding matrix comprises:

applying the first precoding matrix to the reference signal using a first set of antenna ports; and applying the second precoding matrix to the reference signal using the first set of antenna ports or a second set of antenna ports.

3. The method of claim 1, further comprising:

receiving, from the network entity, a third configuration of the one or more reference signal resource sets, the one or more reference signal resources comprising a second reference signal resource comprising a second plurality of sub-bands;

applying a third precoding matrix to a second reference signal to obtain a third precoded reference signal, the third precoding matrix associated with a first sub-band of the second plurality of sub-bands;

applying a fourth precoding matrix to the second reference signal to obtain a fourth precoded reference signal, the fourth precoding matrix associated with a second sub-band of the second plurality of sub-bands; and transmitting the third precoded reference signal during a first symbol period of the first sub-band of the second plurality of sub-bands and transmitting the fourth precoded reference signal during a second symbol period of the second sub-band of the second plurality of sub-bands.

4. The method of claim 3, wherein the first sub-band of the plurality of sub-bands and the first sub-band of the second plurality of sub-bands have a same bandwidth.

5. The method of claim 3, wherein the first sub-band of the plurality of sub-bands and the first sub-band of the second plurality of sub-bands have a different bandwidth.

6. The method of claim 3, wherein the plurality of sub-bands and the second plurality of sub-bands have a same number of sub-bands.

7. The method of claim 3, wherein the plurality of sub-bands and the second plurality of sub-bands have a different number of sub-bands.

8. The method of claim 3, wherein the first and second precoded reference signals are transmitted during a first transmission time interval (TTI) and the third and fourth precoded reference signals are transmitted during the first TTI or during a second TTI.

9. The method of claim 3, further comprising:

receiving, from the network entity, the third configuration based at least in part on at least one of the first, second, third, or fourth precoded reference signals, the third configuration further comprising at least one of precoder information, a number of layers, or a modulation and coding scheme (MCS); and communicating with the network entity over at least one of the first sub-band of the plurality of sub-bands using the first precoding matrix, the second sub-band of the plurality of sub-bands using the second precoding matrix, the first sub-band of the second plurality of sub-bands using the third precoding matrix, or the second sub-band of the second plurality of sub-bands using the fourth precoding matrix based at least in part on the third configuration.

10. The method of claim 9, wherein the reference signal comprises a sounding reference signal (SRS) and the third configuration is received via downlink control signaling associated with an uplink grant.

11. The method of claim 1, wherein the first precoding matrix and the second precoding matrix comprise a same precoding matrix.

12. The method of claim 1, wherein the first precoding matrix and the second precoding matrix comprise a different precoding matrix.

13. The method of claim 1, wherein a precoding granularity of the first precoding matrix is greater than or equal to a number of resource blocks (RBs) in the first sub-band, and a precoding granularity of the second precoding matrix is greater than or equal to a number of RBs in the second sub-band.

14. The method of claim 1, wherein the first sub-band and the second sub-band have a same bandwidth.

15. The method of claim 1, wherein the first sub-band and the second sub-band have a different bandwidth.

16. A method for wireless communication at a network entity, comprising:

transmitting, to a user equipment (UE), a first configuration of one or more reference signal resource sets comprising one or more reference signal resources, the first configuration identifying a reference signal resource of the one or more reference signal resources, the reference signal resource comprising a plurality of sub-bands;

receiving a first reference signal during a first symbol period of a first sub-band of the plurality of sub-bands and receiving a second reference signal during a second symbol period of a second sub-band of the plurality of sub-bands, wherein the first reference signal and the second reference signal comprise precoded reference signals;

computing respective channel estimates of the first sub-band and the second sub-band based at least in part on receiving the first reference signal and the second reference signal;

selecting a reference signal resource set based at least in part on the respective channel estimates; and transmitting, to the UE, a second configuration comprising at least a sounding resource indicator (SRI) based at least in part on the respective channel estimates, wherein the SRI indicates the selected reference signal resource set.

17. The method of claim 16, wherein computing the respective channel estimates of the first sub-band and the second sub-band comprises:

performing independent channel estimation for the first sub-band during the first symbol period based on the first reference signal and the second sub-band during the second symbol period based on the second reference signal.

18. The method of claim 16, further comprising:
transmitting, to the UE, a third configuration of the one or more reference signal resource sets, the third configuration identifying a second reference signal resource of the one or more reference signal resources, the second reference signal resource comprising a second plurality of sub-bands;
receiving a third reference signal during a first symbol period of a first sub-band of the second plurality of sub-bands and receiving a fourth reference signal during a second symbol period of a second sub-band of the second plurality of sub-bands; and
computing second respective channel estimates of the first and second sub-band of the second plurality of sub-bands.

19. The method of claim 18, further comprising:
determining a preferred reference signal resource set based at least in part on the respective channel estimates and the second respective channel estimates; and
transmitting the second configuration based at least in part on the determining, wherein the second configuration comprises the SRI indicating the preferred reference signal resource set.

20. The method of claim 18, wherein the first sub-band of the plurality of sub-bands and the first sub-band of the second plurality of sub-bands have a same bandwidth.

21. The method of claim 18, wherein the first sub-band of the plurality of sub-bands and the first sub-band of the second plurality of sub-bands have a different bandwidth.

22. The method of claim 18, wherein the plurality of sub-bands and the second plurality of sub-bands have a same number of sub-bands.

23. The method of claim 18, wherein the plurality of sub-bands and the second plurality of sub-bands include a different set of sub-bands.

24. The method of claim 18, wherein the plurality of sub-bands and the second plurality of sub-bands include a same set of sub-bands or a different set of sub-bands.

25. The method of claim 18, wherein the first and second reference signals are received in a first transmission time interval (TTI) and the third and fourth reference signals are received in the first TTI or a second TTI.

26. The method of claim 16, further comprising:
receiving, from a second UE, a third reference signal during the first symbol period of the first sub-band of the plurality of sub-bands and a fourth reference signal during the second symbol period of the second sub-band of the plurality of sub-bands;
computing second respective channel estimates of the first sub-band and the second sub-band; and
transmitting a third configuration comprising at least a second SRI, a number of layers, precoder information, or a MCS to the second UE based at least in part on the second respective channel estimates.

27. The method of claim 16, wherein the second configuration further comprises at least one of precoder information, a number of layers, or a modulation and coding scheme (MCS).

28. An apparatus for wireless communication, comprising:
a processor;
memory in electronic communication with the processor; and
instructions stored in the memory and operable, when executed by the processor, to cause the apparatus to:
receive, from a network entity, a configuration of one or more reference signal resource sets comprising one or more reference signal resources, the one or more reference signal resources comprising a reference signal resource comprising a plurality of sub-bands;
apply a first precoding matrix to a reference signal to obtain a first precoded reference signal, the first precoding matrix associated with a first sub-band of the plurality of sub-bands;
apply a second precoding matrix to the reference signal to obtain a second precoded reference signal, the second precoding matrix associated with a second sub-band of the plurality of sub-bands;
transmit the first precoded reference signal during a first symbol period of the first sub-band and transmit the second precoded reference signal during a second symbol period of the second sub-band; and
receive, from the network entity, a second configuration comprising at least a sounding resource indicator (SRI) at least in part in response to the first precoded reference signal and the second precoded reference signal, wherein the SRI indicates a reference signal resource set selected based at least in part on the first precoded reference signal and the second precoded reference signal.

29. The apparatus of claim 28, wherein the instructions to apply the first precoding matrix and the second precoding matrix are further executable by the processor to cause the apparatus to:
apply the first precoding matrix to the reference signal using a first set of antenna ports; and
apply the second precoding matrix to the reference signal using the first set of antenna ports or a second set of antenna ports.

30. An apparatus for wireless communication at a network entity, comprising:
a processor;
memory in electronic communication with the processor; and
instructions stored in the memory and operable, when executed by the processor, to cause the apparatus to:
transmit, to a user equipment (UE), a first configuration of one or more reference signal resource sets comprising one or more reference signal resources, the first configuration identifying a reference signal resource of the one or more reference signal resources, the reference signal resource comprising a plurality of sub-bands;
receive a first reference signal during a first symbol period of a first sub-band of the plurality of sub-bands and receive a second reference signal during a second symbol period of a second sub-band of the plurality of sub-bands, wherein the first reference signal and the second reference signal comprise precoded reference signals;
compute respective channel estimates of the first sub-band and the second sub-band based at least in part on receiving the first reference signal and the second reference signal;

selecting a reference signal resource set based at least in part on the respective channel estimates; and transmit, to the UE, a second configuration comprising at least a sounding resource indicator (SRI) based at least in part on the respective channel estimates, wherein the SRI indicates the selected reference signal resource set.

\* \* \* \* \*